(12) United States Patent
Cairns

(10) Patent No.: US 10,248,476 B2
(45) Date of Patent: Apr. 2, 2019

(54) EFFICIENT COMPUTATIONS AND NETWORK COMMUNICATIONS IN A DISTRIBUTED COMPUTING ENVIRONMENT

(71) Applicant: SAS Institute Inc., Cary, NC (US)

(72) Inventor: Douglas Allan Cairns, Durham, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 15/986,037

(22) Filed: May 22, 2018

(65) Prior Publication Data

US 2018/0336075 A1    Nov. 22, 2018

Related U.S. Application Data

(60) Provisional application No. 62/509,488, filed on May 22, 2017.

(51) Int. Cl.
   *G06F 17/30* (2006.01)
   *G06F 9/54* (2006.01)
   (Continued)

(52) U.S. Cl.
   CPC .............. *G06F 9/542* (2013.01); *G06F 15/18* (2013.01); *G06F 17/30516* (2013.01);
   (Continued)

(58) Field of Classification Search
   CPC .............. G06F 9/542; G06F 17/30516; G06F 17/30536
   See application file for complete search history.

(56) References Cited

U.S. PATENT DOCUMENTS 6,278,989 B1 *  8/2001  Chaudhuri ........ G06F 17/30463
9,268,796 B2    2/2016  Pope et al.
(Continued)

OTHER PUBLICATIONS

Santoro, N. et al., "A distributed selection algorithm and its expected communication complexity", Theoretical Computer Science 100 (1992) 185-205, Elsevier.
(Continued)

*Primary Examiner* — Tarek Chbouki

(57) ABSTRACT

Exemplary embodiments relate to the problem of determining measurements in a distributed computing environment in which observations relating to the measurements are distributed amongst two or more nodes. Each node, which stores a number of node-specific observations, makes available its observation count and a number of observation sketches. The observations are merged into an array, and the sketches from each node are combined into overall summary sketches representing a summary of the observations across all the nodes. The summary sketches may then be used to approximate the measurement. The described techniques allow for the computation of arbitrary measurements (i.e., measurements that are not predetermined and for whose calculation the environment is not preconfigured) in a grid computing environment with a technical advantage of having very few rounds of data communication (e.g., two or less) required between the nodes in the computing grid.

31 Claims, 18 Drawing Sheets

(51) Int. Cl.
*H04L 29/08* (2006.01)
*G06F 15/18* (2006.01)
*H04L 12/24* (2006.01)

(52) U.S. Cl.
CPC .... *G06F 17/30536* (2013.01); *H04L 41/0893* (2013.01); *H04L 67/125* (2013.01)

(56) References Cited

U.S. PATENT DOCUMENTS

| | | | |
|---|---|---|---|
| 9,507,833 B2 | 11/2016 | Guirguis et al. | |
| 2015/0234955 A1* | 8/2015 | Joshi | G06F 17/5009 703/2 |
| 2015/0363232 A1* | 12/2015 | Li | G06F 9/5011 718/104 |
| 2017/0364590 A1* | 12/2017 | Hill | G06F 17/30864 |

OTHER PUBLICATIONS

Zhang, Shuzhuang Luo, Hao Wu, Zhigang Wang, Yi. (2017). "Composed sketch framework for quantiles and cardinality queries over big data streams." ResearchGate. 39. 10.1145/3063955. 3063995.

Rodeh, Michael., "Finding the Median Distributively", Journal of Computer and Systems Sciences 24, 162-166 (1982).

Grama, Ananth., "Introduction to Parallel Computing" Publisher: Addison Wesley, Jan. 16, 2003.

Shrivastava, Nisheeth "Medians and Beyond: New Aggregation Techniques for Sensor Networks", Department of Computer Science, University of California, arXiv:cs/0408039v1 [cs.DC] Aug. 17, 2004.

Z. Karnin, K. Lang and E. Liberty, "Optimal Quantile Approximation in Streams," 2016 IEEE 57th Annual Symposium on Foundations of Computer Science (FOCS), New Brunswick, NJ, 2016, pp. 71-78. doi: 10.1109/FOCS.2016.17.

* cited by examiner

EFFICIENT COMPUTATIONS AND NETWORK COMMUNICATIONS IN A DISTRIBUTED COMPUTING ENVIRONMENT

RELATED APPLICATIONS

This application claims priority to U.S. Provisional Application Ser. No. 62/509,488, entitled "Efficient Computation of Robust Statistics in a Distributed Computing Environment" and filed on May 22, 2017. The contents of the aforementioned application are incorporated herein by reference.

BACKGROUND

The performance of analyses of large data sets (e.g., what is commonly referred to as "big data") is becoming increasingly commonplace in such areas as computer simulations, process monitoring, automated decision making, and behavioral modeling. Such analysis are often performed by grids of varying quantities of available node devices, while the data sets are often stored within a separate set of storage devices. This begets the challenge of efficiently exchanging such data in a computer network between node devices in a grid of computer node devices.

Distributed systems may allow for information to be stored across a computer network. In many cases, each node of the distributed system stores a subset of the information, such as information observed at that particular node. It may be desirable to make measurements across all the information stored in the computer network, in order to draw conclusions about the information (e.g., a maximum value in the observations, an average of the observations, a standard deviation of the observations, etc.).

In order to obtain a full picture of the information, one possible solution is for each node to transmit its data, either to all the other nodes (so that each node can have a copy of all the information), or to a master node (which can then perform measurements on the information). One problem with this approach is that it requires a large number of data transmissions involving a large amount of data; such an approach does not scale well as more nodes are added and as more observations are recorded at each node in the grid of computer node devices.

Another approach is to preconfigure the distributed system to allow for the calculation of particular, predetermined measurements across the nodes using measurement-specific algorithms. Although this solution may require less data communication between the nodes, it has the downside of being limited to the determination only of those measurements whose algorithms are already pre-deployed in the computer network. It is not generalizable to determining an arbitrary measurement whose calculation logic has not been pre-deployed in the computer network.

In both of these conventional techniques, data reads into memory may be expensive; in a system including potentially billions of observations, the time required to read that data (potentially multiple times) can be prohibitive and the data read process itself may be computationally infeasible.

In contrast to the conventional techniques, the present disclosure herein describes a procedure for efficiently determining an arbitrary measurement in a grid computing environment, with a small number of data reads (typically two or fewer, which may be done preemptively) and a significantly reduced amount of computer network transmissions that results in technical improvements to the functionality of computing in a grid environment.

SUMMARY

This summary is not intended to identify only key or essential features of the described subject matter, nor is it intended to be used in isolation to determine the scope of the described subject matter. The subject matter should be understood by reference to appropriate portions of the entire specification of this patent application, any or all drawings, and each claim.

According to exemplary embodiments, methods, mediums, and systems are described for approximating a calculation of a measurement in a single read pass through data stored across a distributed computing grid. For example, the measurement may be a robust statistic, which is not a predetermined statistic that is specified before receiving the instruction to determine the measurement.

A plurality of nodes of the computing grid may be instructed to determine a measurement from observations distributed among the plurality (K) of nodes in the grid. The observations may each be associated with a plurality (N) of variables.

At each node of the plurality of nodes, node-specific observations may be counted. The counting may be performed by: accessing a data repository storing the node-specific observations, counting a number of the observations in the data repository, allocating a node-specific observation count array having a number of slots (K) corresponding to a number of the plurality of nodes, inserting the number of observations into a slot in the node-specific observation count array corresponding to a current node associated with the observations, and transmitting the node-specific observation count array to at least one other node of the plurality of nodes. In some embodiments, the node-specific observation count array may be transmitted to a master node that coordinates calculation of the measurement. In others, the node-specific observation count array may be transmitted to all other nodes of the grid on which the observations are stored.

The observation counts may be combined across the plurality of nodes. The combining may include: receiving a plurality (K) of node-specific observation count arrays, each containing node-specific observation counts, each observation count originating at a respective node in the distributed environment, the observation counts representing a number of observations of data stored at the respective node, and merging the plurality of node-specific observation count arrays into an overall observation count array comprising the K node-specific observation counts—one for each node in the plurality (K) of nodes.

At each node of the plurality of nodes, a node-specific sketch array may be constructed. The node-specific sketch array may be constructed by determining a node-specific sketch for each of the N variables associated with the node-specific observations, the node-specific sketch representing a summary of the observations stored at the respective node as those observations relate to each of the N variables and generated by mapping the respective node's observations via a sketching algorithm into a vector that records frequency information relating to the respective node's observations. For example, the node-specific sketch may be histograms of the values for the variables. A node-specific sketch array may be allocated, having a number of slots corresponding to the product (N*K) of the number of the plurality of nodes and the number of the plurality of variables, for each of the plurality (N) of variables. An amount of space (e.g., an array) may be allocated for each slot based on a worst-case estimate for the size of each sketch, as determined based on the observation counts from each node. A corresponding node-specific sketch for the variable may be inserted into a slot in the node-specific sketch array corresponding to a current node and current variable, and the node-specific sketch array may be transmitted to the at least one other node of the plurality of nodes.

The node-specific sketches may be determined in a number of ways. For example, a one-step operation (in which each observation is read only once to compute the sketch), may be implemented as follows: (1) forking, at a respective node, a plurality of threads, a number of the plurality of threads corresponding to a number of the plurality of variables, each thread associated with a corresponding sketch, (2) reading a next observation from among the node-specific observations stored at the respective node, (3) on each of the plurality of threads, updating the corresponding sketch by mapping the next observation via the sketching procedure into a vector that records frequency information relating to the next observation, and (4) repeating (2) and (3) in parallel until each observation of the node-specific observations is accounted for.

In another example, a multi-step operation may be implemented by: (1) dividing, at the respective node, a number of the node-specific observations stored at the respective node into a number of subsets, (2) forking, at the respective node, a plurality of threads, a number of the plurality of threads corresponding to the number of subsets, (3) on each of the plurality of threads, reading a next observation from among the subset of node-specific observations assigned to the thread, (4) on each of the plurality of threads, updating each sketch associated with the respective node by mapping the next observation via the sketching procedure into a vector that records frequency information relating to the next observation, and (5) repeating (3) and (4) in parallel on the plurality of threads until each observation of the node-specific observations is accounted for.

A plurality (K) of node-specific sketch arrays may be received, each node-specific sketch array originating at a respective node in the distributed environment. A summary array may be allocated to summarize the plurality (K) of node-specific sketch arrays. The summary array may comprise the summary array comprising a number of slots (N) corresponding to the number of variables associated with the observations, each slot holding a summary sketch for summarizing the node-specific sketches from each node related to a given variable.

To merge the node-specific sketch arrays into a single sketch per variable, each node-specific sketch from the node-specific sketch array may be accessed, each node-specific sketch consisting of sketches for each of the N variables. Sketch merging logic may also be accessed, which defines how to combine multiple sketches for the node-specific sketch variable. The sketch merging logic may be applied to merge the current node-specific sketch for a given variable with a summary sketch for the corresponding variable in the summary array.

To approximate a calculation of the measurement, one or more variables are selected. Summary sketches related to the selected variables may be accessed, and the summary sketches may be used to generate an approximation of a determination of the measurement. The approximation may be generated using one communication rounds among nodes of the distributed computing grid, where a communication round comprises each of the nodes of the distributed computing grid transmitting information to other nodes of the distributed computing grid.

The measurement may be approximated in a number of ways. For example, the calculation may be approximated by a pairwise method by: dividing a selected sketch from the summary sketches into a plurality of bins, for each pair of bins in the plurality of bins, calculating a contribution of the pair of bins to an empirical density function of the observations; summing a weighted contribution of each pair of bins; generating the empirical density function from the summed weighted contributions; and calculating the measurement from the empirical density function.

In another example, the measurement may be approximated by an approximate data regeneration method by: dividing a selected sketch from the final sketches into a plurality of bins; approximating one or more data points from the observations within one or more of the plurality of bins; and using the approximated data points to compute the measurement.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Systems depicted in some of the figures may be provided in various configurations. In some embodiments, the systems may be configured as a distributed system where one or more components of the system are distributed across one or more networks in a cloud computing system.

Figure 1:
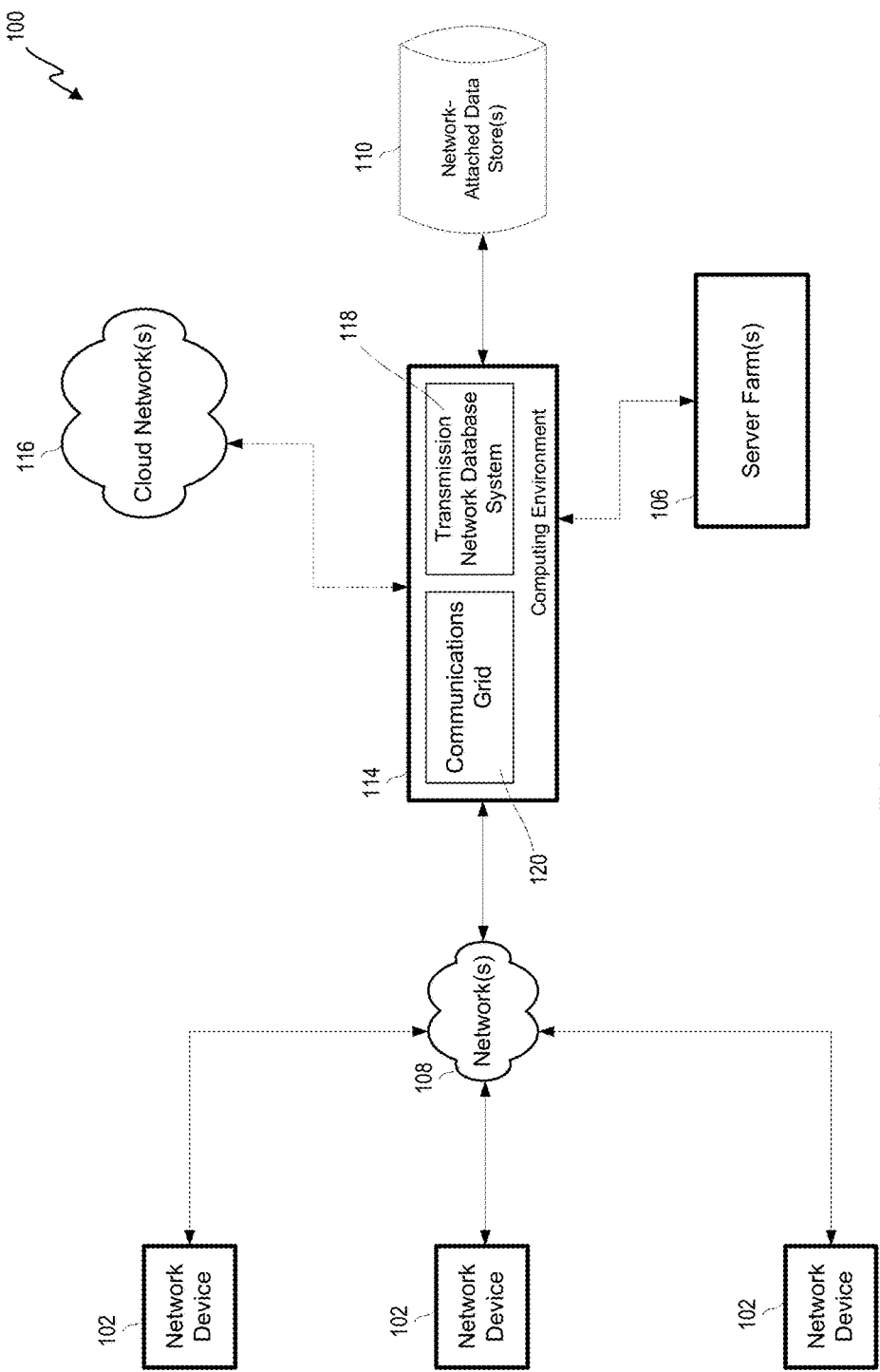
FIG. 1 illustrates a block diagram that provides an illustration of the hardware components of a computing system, according to some embodiments of the present technology.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
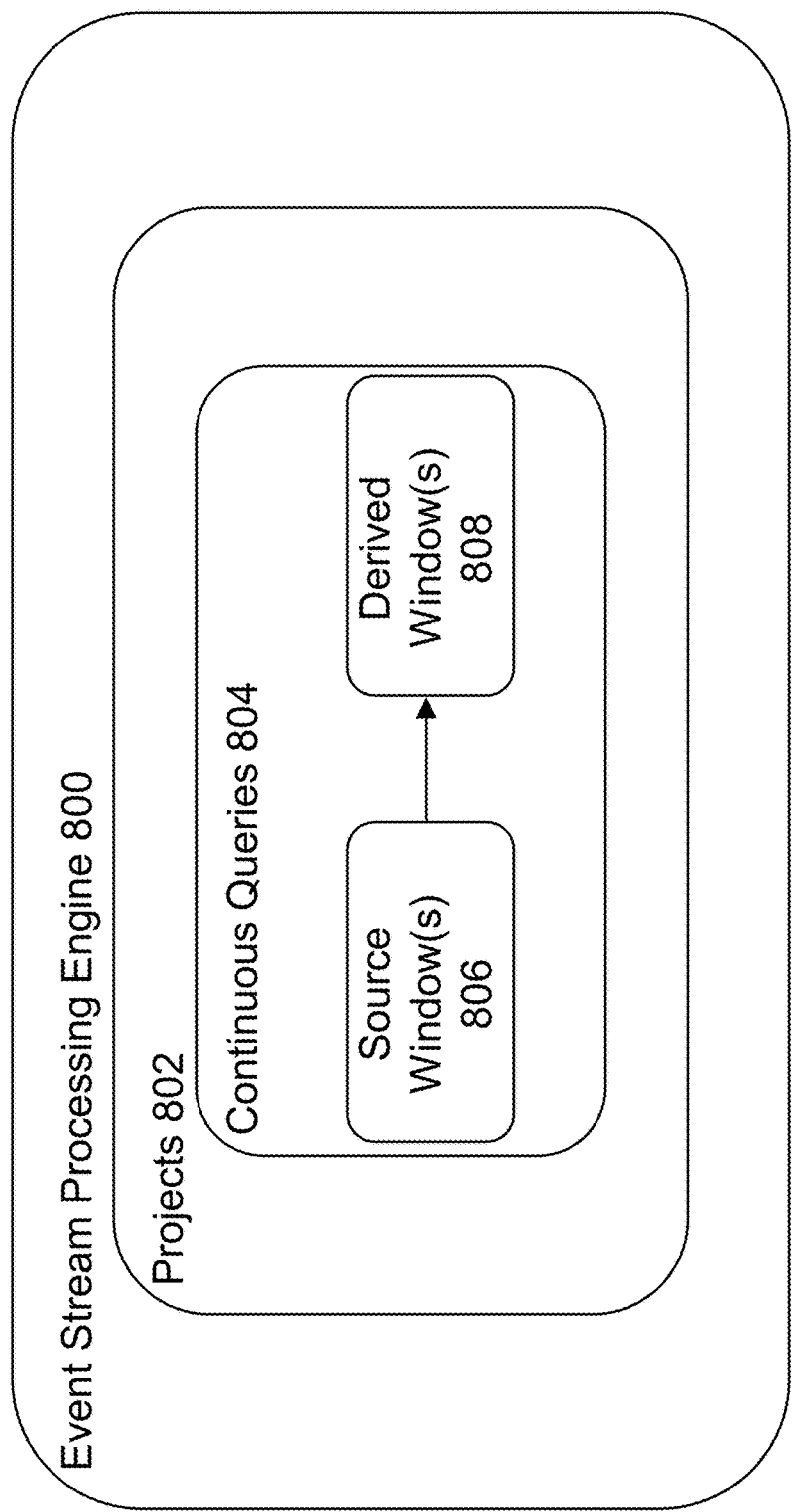
FIG. 8 illustrates a block diagram including components of an Event Stream Processing Engine (ESPE), according to embodiments of the present technology.
Figure 9:
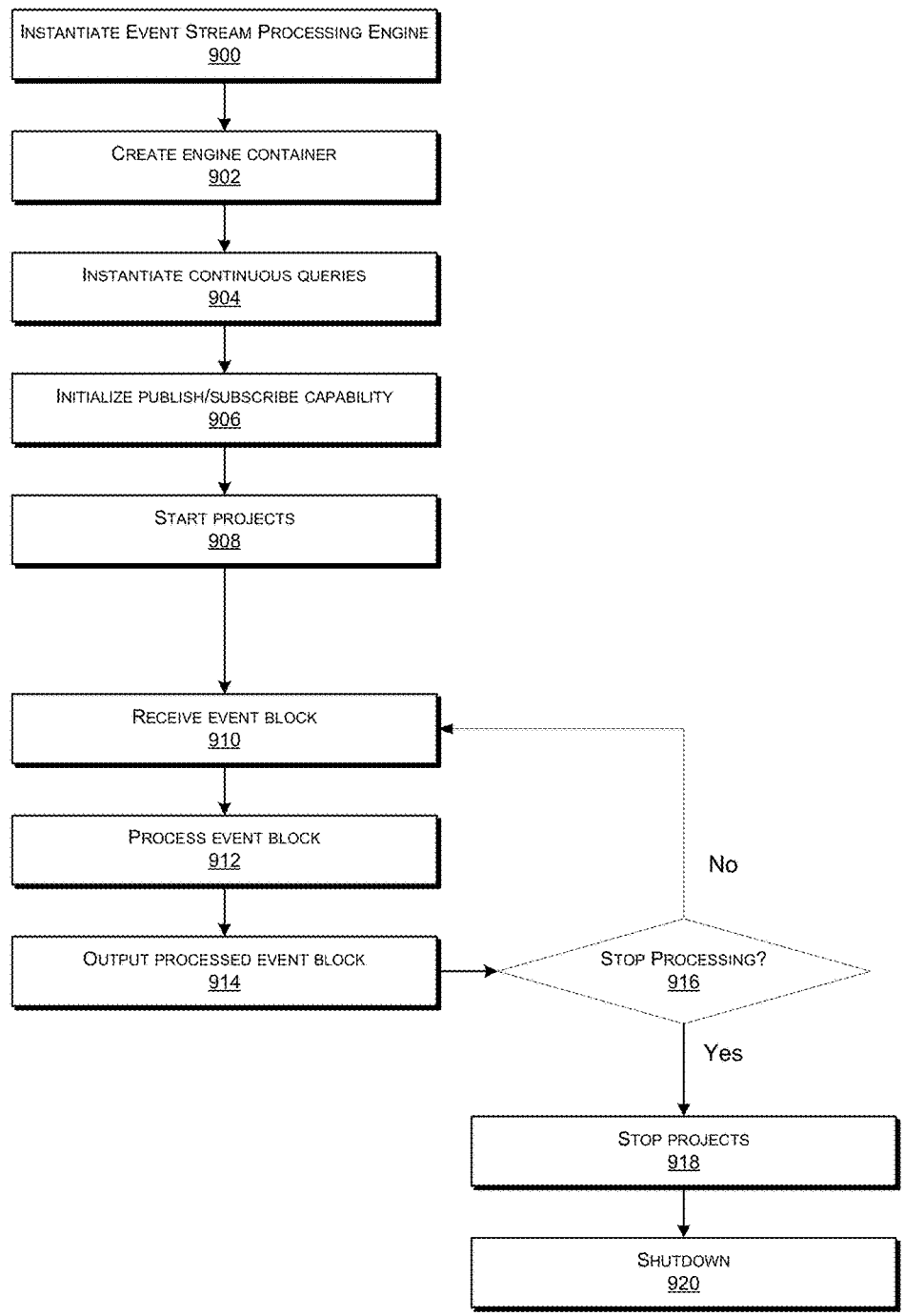
FIG. 9 illustrates a flow chart showing an example process including operations performed by an event stream processing engine, according to some embodiments of the present technology.
Figure 10:
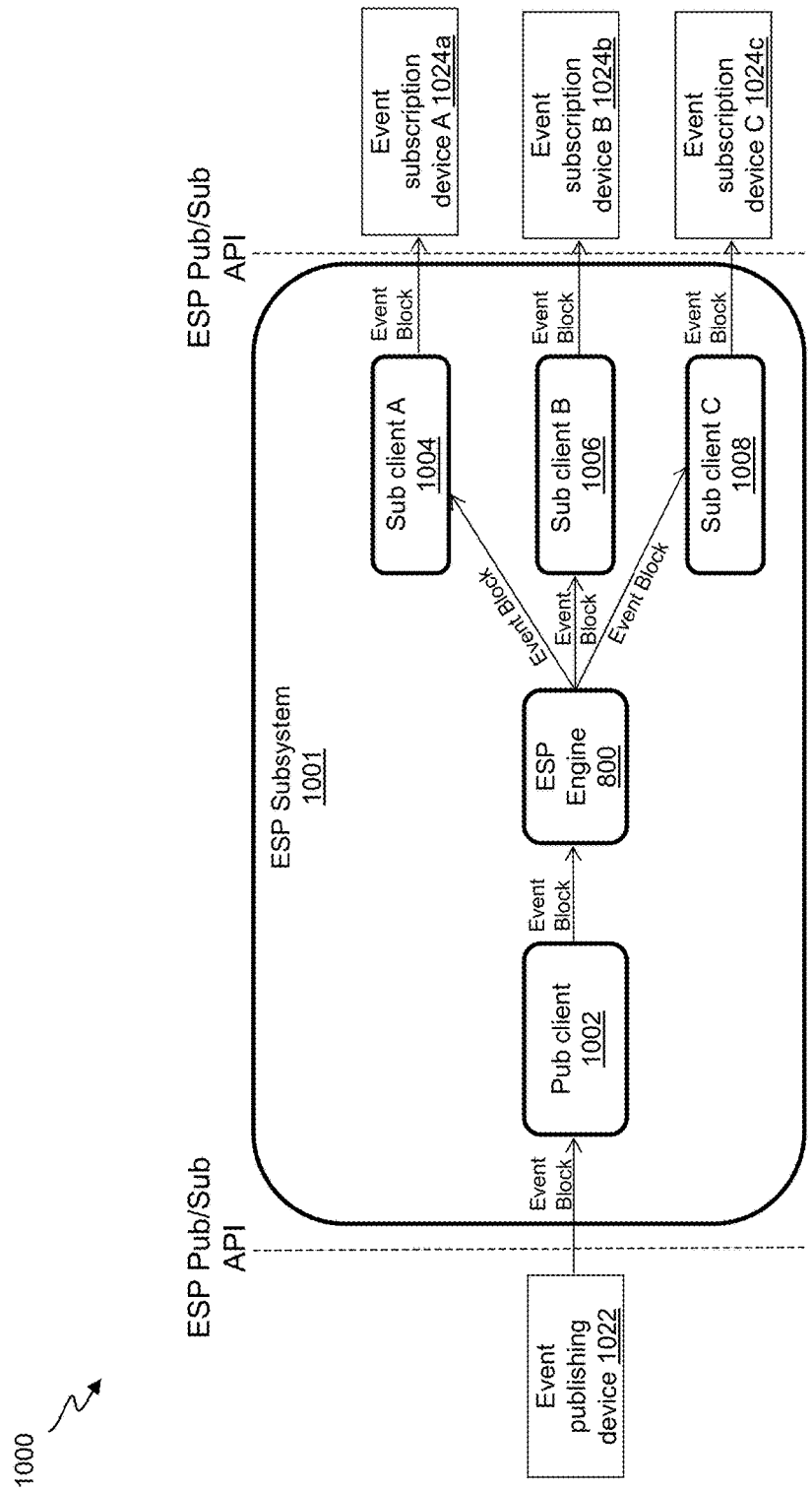
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may comprise one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. IoT may be implemented in various areas, such as for access (technologies that get data and move it), embed-ability (devices with embedded sensors), and services. Industries in the IoT space may automotive (connected car), manufacturing (connected factory), smart cities, energy and retail. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
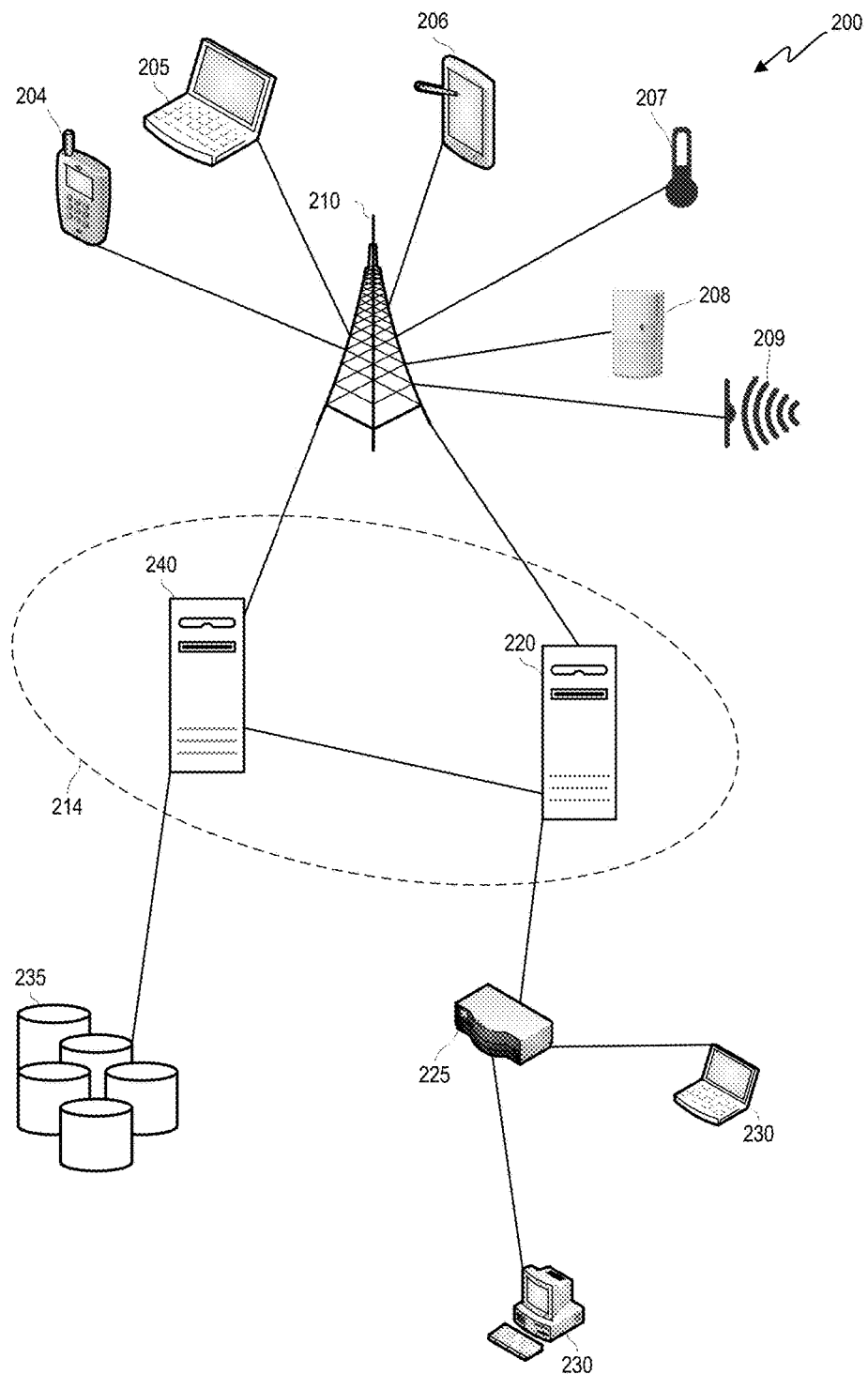
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values computed from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
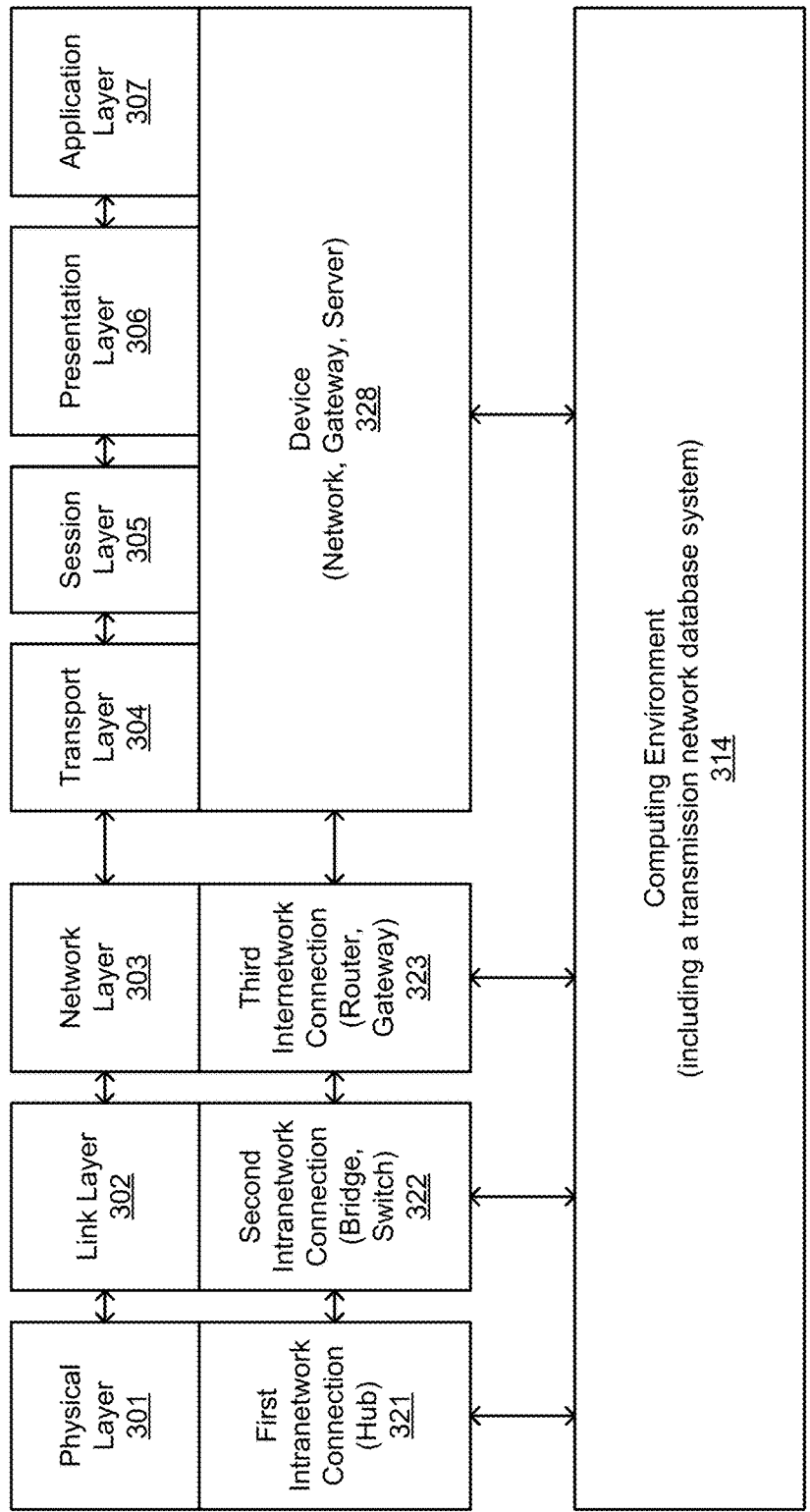
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 302-314. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 302. Physical layer 302 represents physical communication, and can define parameters of that physical communication. For example, such physical communication may come in the form of electrical, optical, or electromagnetic signals. Physical layer 302 also defines protocols that may control communications within a data transmission network.

Link layer 304 defines links and mechanisms used to transmit (i.e., move) data across a network. The link layer manages node-to-node communications, such as within a grid computing environment. Link layer 304 can detect and correct errors (e.g., transmission errors in the physical layer 302). Link layer 304 can also include a media access control (MAC) layer and logical link control (LLC) layer.

Network layer 306 defines the protocol for routing within a network. In other words, the network layer coordinates transferring data across nodes in a same network (e.g., such as a grid computing environment). Network layer 306 can also define the processes used to structure local addressing within the network.

Transport layer 308 can manage the transmission of data and the quality of the transmission and/or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt and/or format data based on data types known to be accepted by an application or network layer.

Application layer 314 interacts directly with software applications and end users, and manages communications between them. Application layer 314 can identify destinations, local resource states or availability and/or communication content or formatting using the applications.

Intra-network connection components 322 and 324 are shown to operate in lower levels, such as physical layer 302 and link layer 304, respectively. For example, a hub can operate in the physical layer, a switch can operate in the physical layer, and a router can operate in the network layer. Inter-network connection components 326 and 328 are shown to operate on higher levels, such as layers 306-314. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
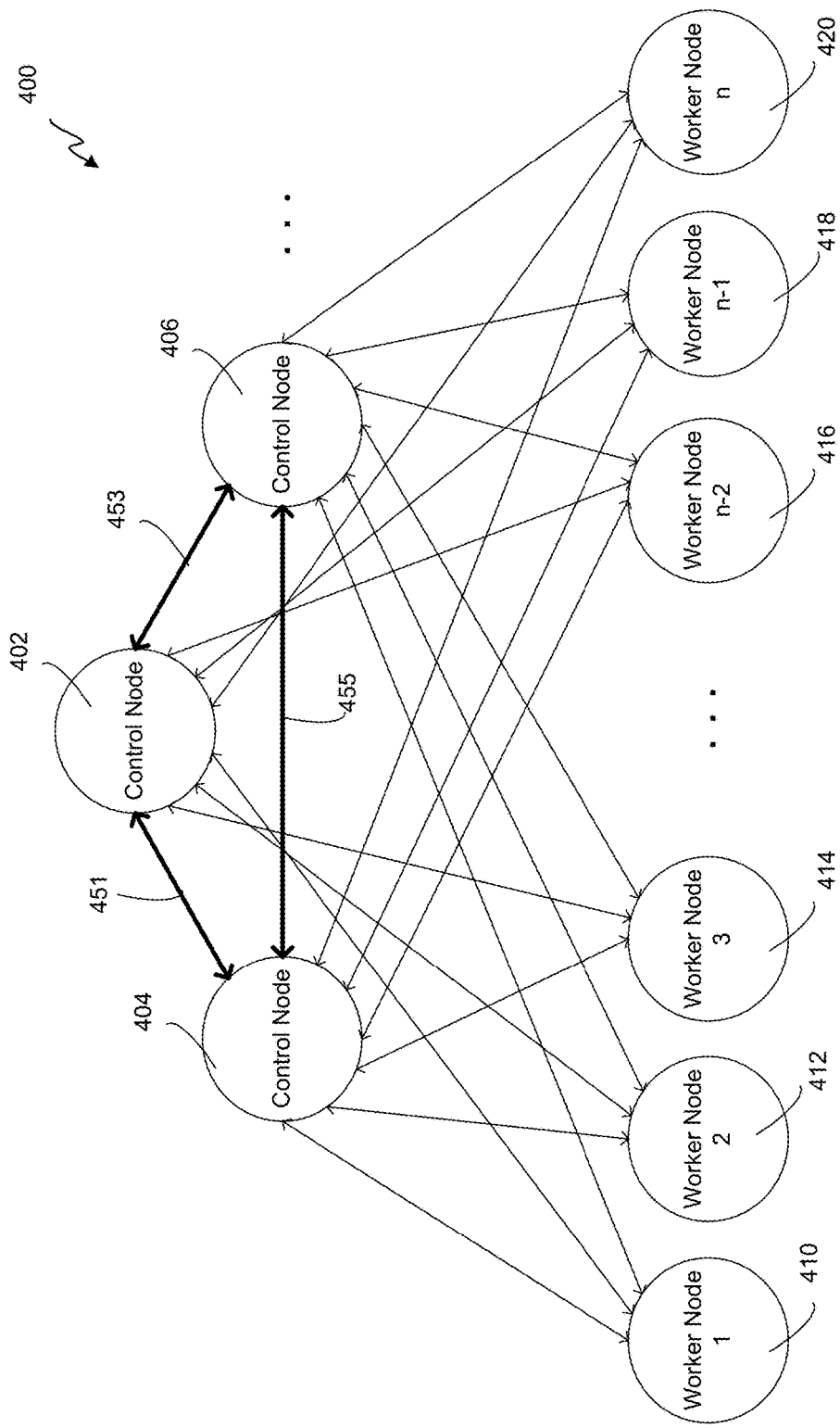
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be receive or stored by a machine other than a control node (e.g., a Hadoop data node).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes). The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
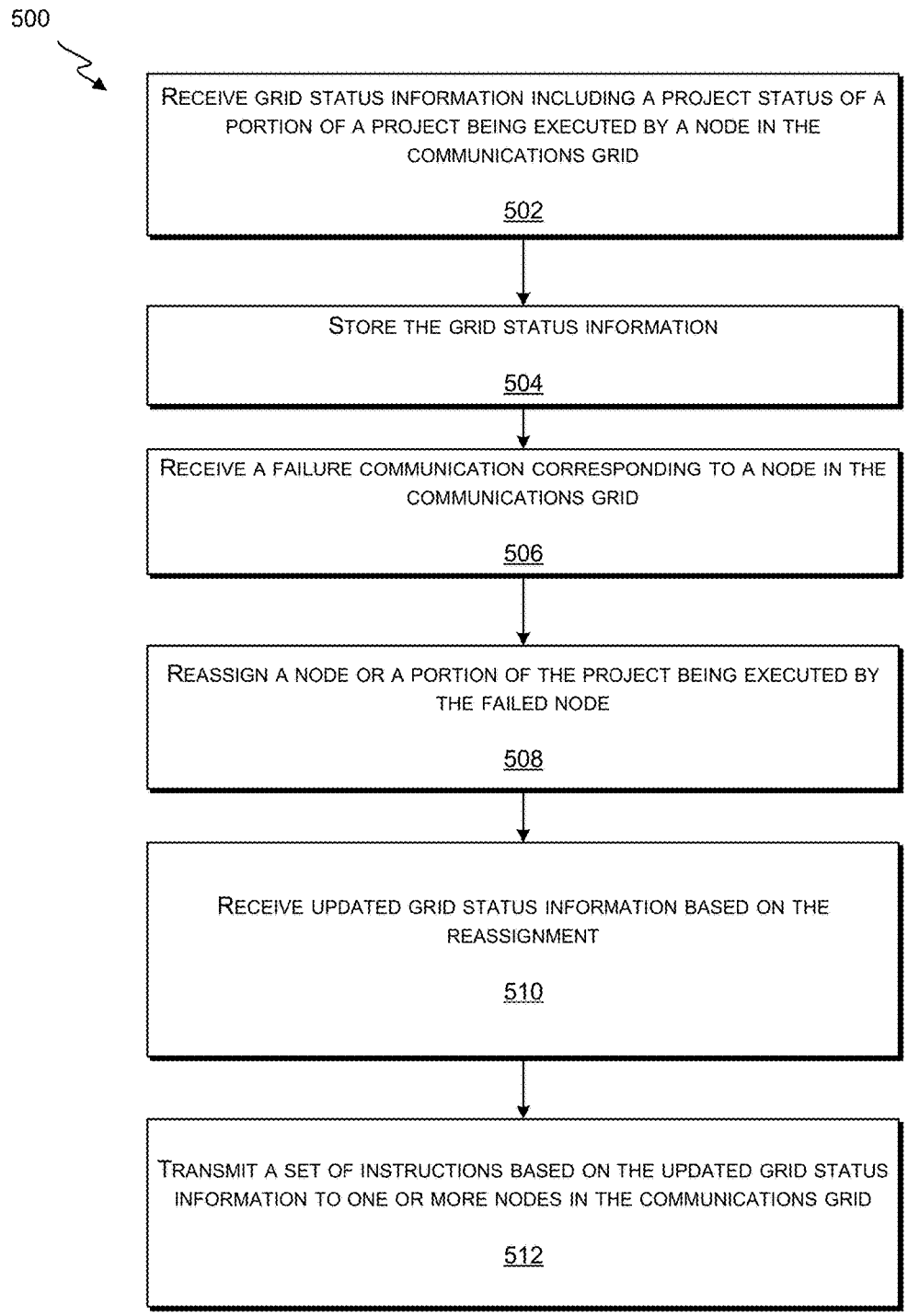
FIG. 5 illustrates a flow chart showing an example process for adjusting a communications grid or a work project in a communications grid after a failure of a node, according to some embodiments of the present technology.

FIG. 5 illustrates a flow chart showing an example process for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
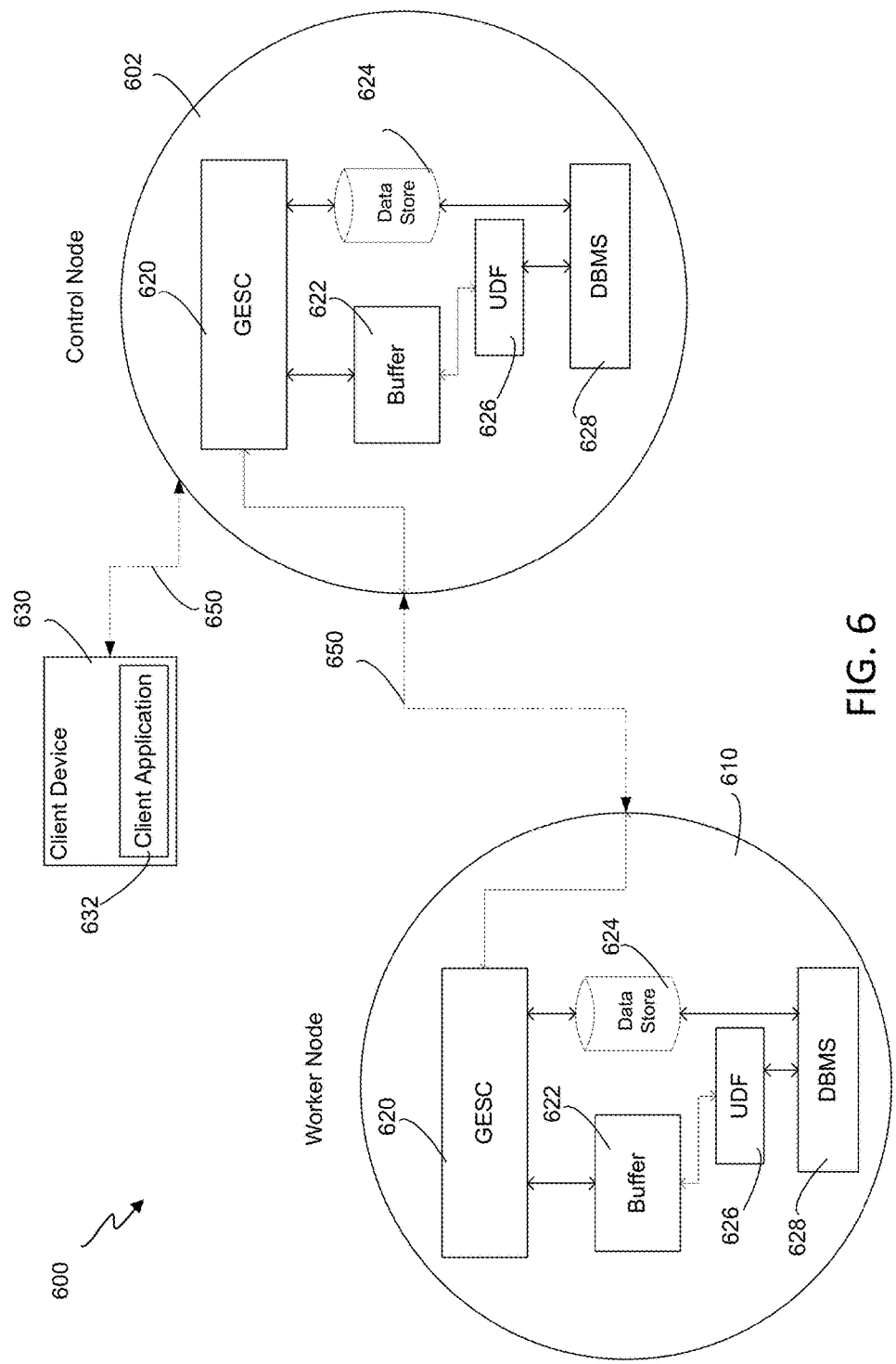
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within a memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client deice 630. More specifically, control node 602 may communicate with client application 632 hosted by the client device 630 to receive queries and to respond to those queries after processing large amounts of data.

DMBS 628 may control the creation, maintenance, and use of database or data structure (not shown) within a nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
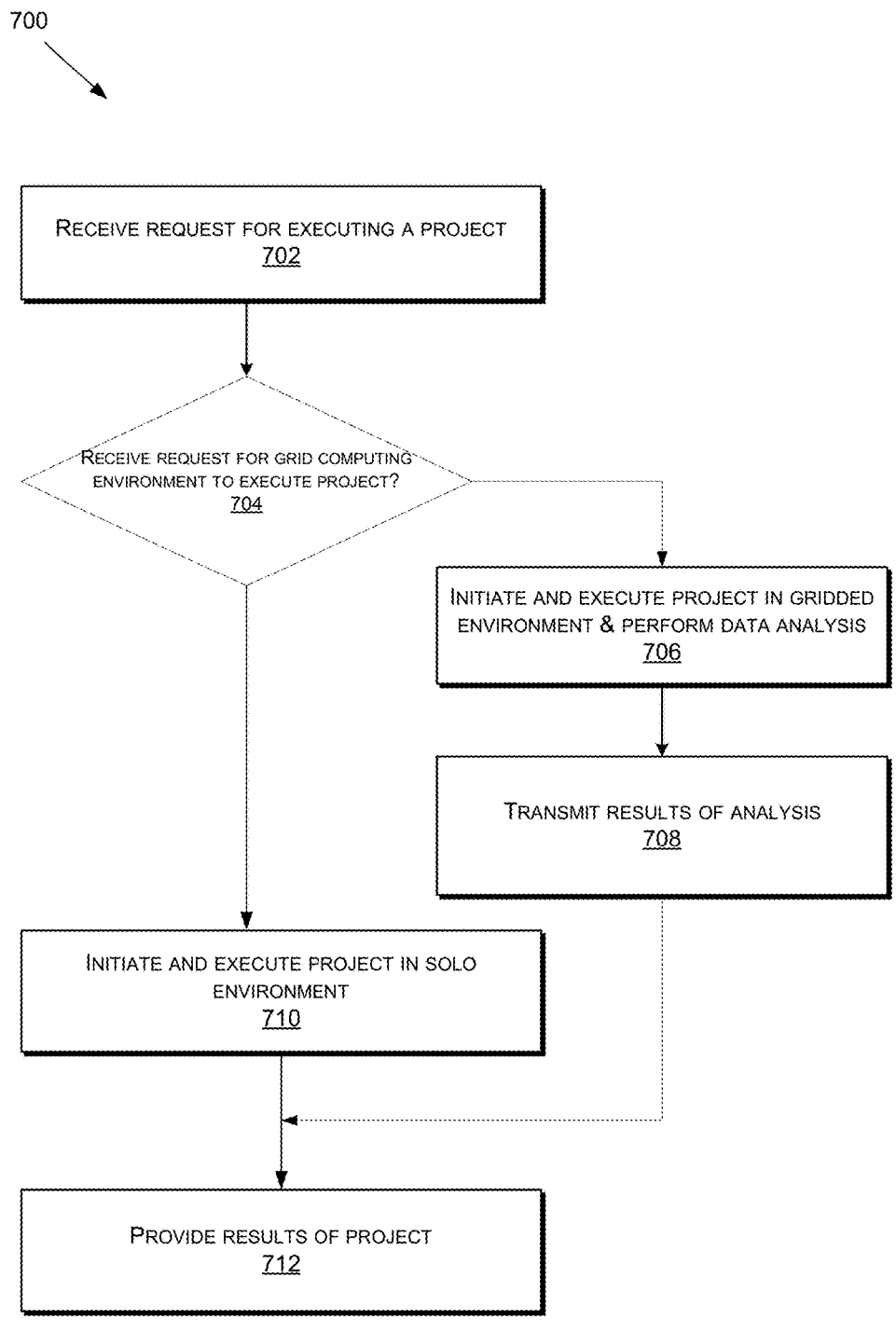
FIG. 7 illustrates a flow chart showing an example process for executing a data analysis or processing project, according to some embodiments of the present technology.

FIG. 7 illustrates a flow chart showing an example method for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a-c*, according to embodiments of the present technology. ESP system 1000 may include ESP device or subsystem 1001, event publishing device 1022, an event subscribing device A 1024*a*, an event subscribing device B 1024*b*, and an event subscribing device C 1024*c*. Input event streams are output to ESP device 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024*a*, event subscribing device B 1024*b*, and event subscribing device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024*a*, event subscribing device B 1024*b*, and event subscribing device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024*a* using the publish/subscribe API. Subscribing client B 1006 may be started by an event subscription application B executing at event subscribing device B 1024*b* using the publish/subscribe API. Subscribing client C 1008 may be started by an event subscription application C executing at event subscribing device C 1024*c* using the publish/subscribe API.

An event block object containing one or more event objects is injected into a source window of the one or more source windows 806 from an instance of an event publishing application on event publishing device 1022. The event block object may generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 806, and subscribing client C 808 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024*a-c*. For example, subscribing client A 804, subscribing client B 806, and subscribing client C 808 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
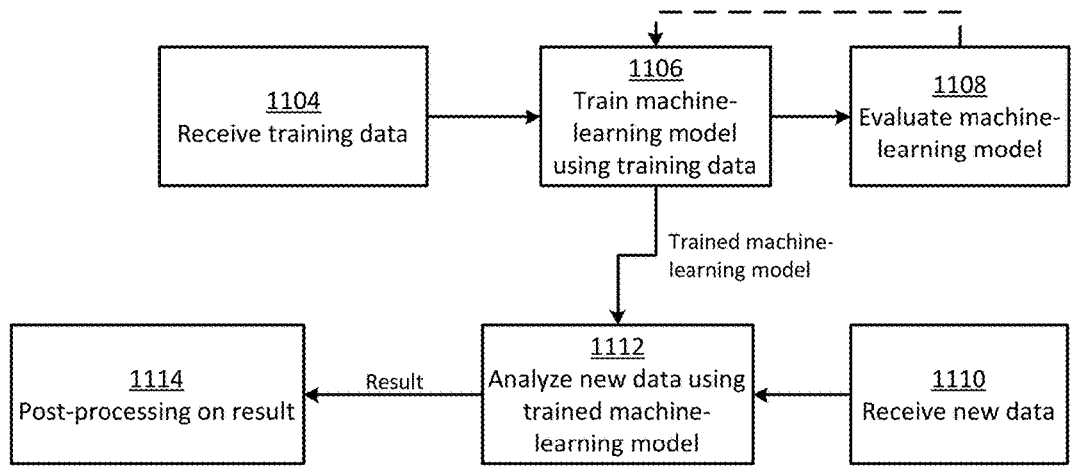
FIG. 11 illustrates a flow chart of an example of a process for generating and using a machine-learning model according to some aspects.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
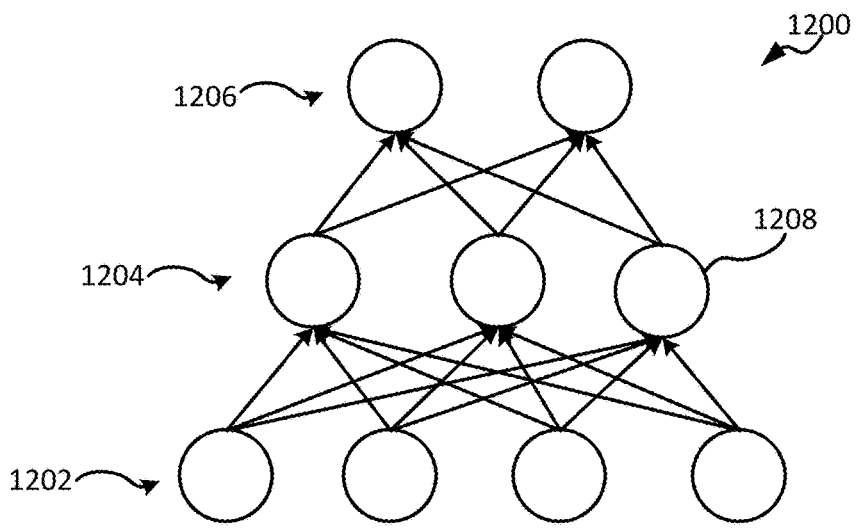
FIG. 12 illustrates an example of a machine-learning model as a neural network.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the following equation:

$$y = \max(x, 0)$$

where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide(GaAs)) devices. These processors may also be employed in heterogeneous computing architectures with a number of and a variety of different types of cores, engines, nodes, and/or layers to achieve various energy efficiencies, processing speed improvements, data communication speed improvements, and/or data efficiency targets and improvements throughout various parts of the system described herein.

Exemplary embodiments relate to the problem of determining measurements in a distributed computing environment in which observations relating to the measurements are distributed amongst two or more nodes. Conventionally, such determinations were either tailored to a particular measurement (and therefore not generalizable), or require numerous data reads and a large amount of network bandwidth.

Each node in the distributed environment may store one or more observations of the node. To approximate a measurement of the observations, each node computes one or more sketches related to its observations. A sketch represents a summary of the observations, as described in more detail below.

Each node may distribute the sketches to a master node, or to all nodes in the distributed computing environment. When all sketches are received, the node(s) may merge the disparate sketches into a single summary sketch for each variable. The system can then approximate the measurement for one or more variables by consulting the summary sketch and compute an estimate of the measurement.

Figure 13:
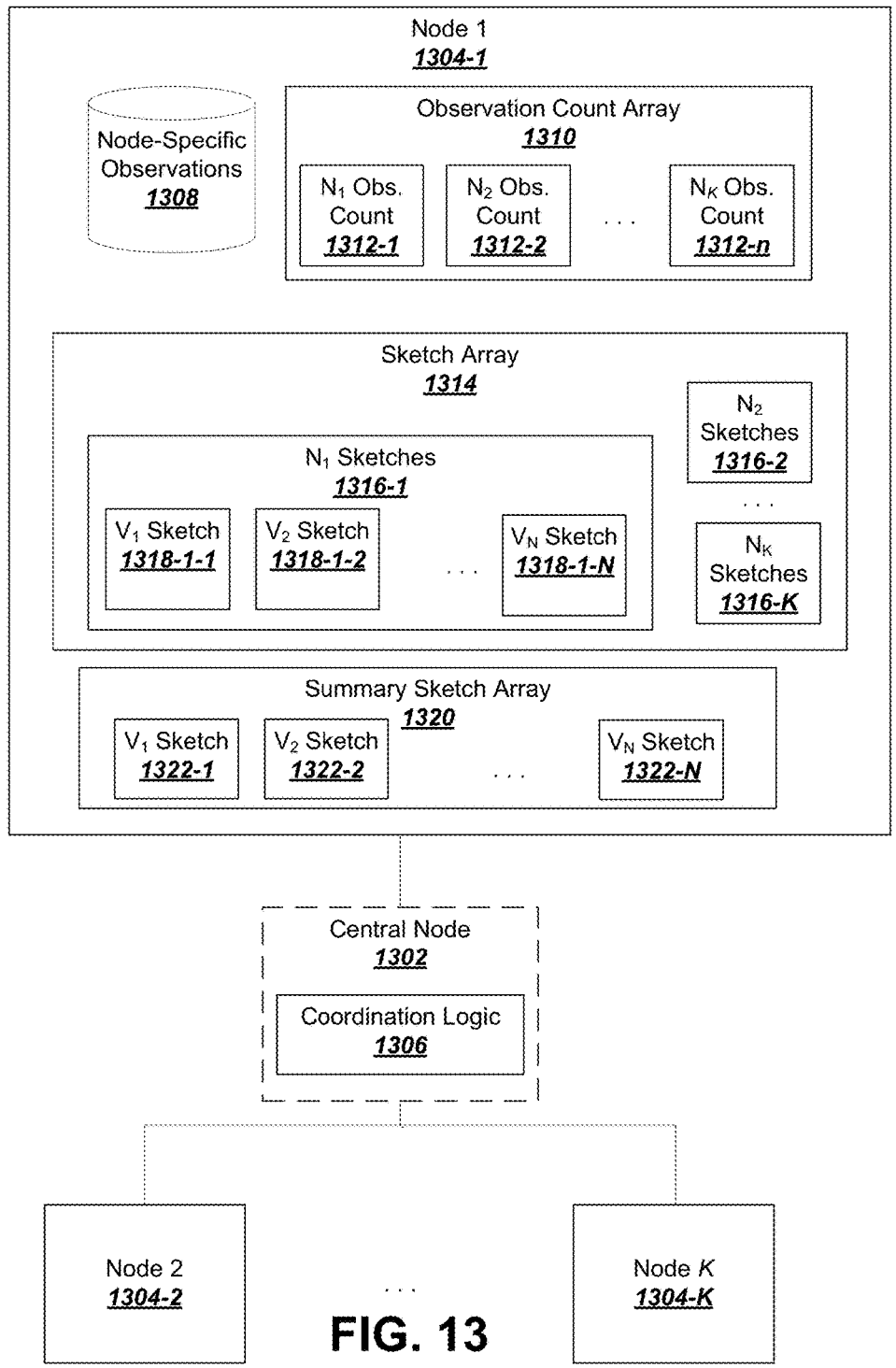
FIG. 13 illustrates an exemplary environment in which a measurement based on observations distributed among multiple nodes may be approximated.

FIG. 13 depicts an exemplary distributed environment in which an embodiment of the above-described technique may be employed.

A distributed environment may include a number K of nodes 1304-1, 1304-2, . . . 1304-K. Optionally, the nodes 1304-i may be coordinated by a central or master node 1302 having coordination logic 1306 (such as the logic described in connection with FIGS. 14-16). Alternatively or in addition, the coordination logic 1306 may be distributed among the various nodes 1304-i.

Each node 1304-i may store a repository of node-specific observations 1308 recorded at the node. Each observation in the repository 1308 may be associated with a number N of variables. The variables may depend on the application, and more particularly to the types of observations stored at the nodes. For example, an observation may be represented by a row of data stored in a database, where each data item in the row corresponds to a variable. In another example, the data may be a data stream, where an observation represents one discrete data unit in the data stream, made up of a plurality of values (representing the variables).

As part of the procedure described herein, each node may allocate an observation count array 1310. The observation count array 1310 is configured to store the number of observations stored at each node (i.e., the number of observations in each node's repository 1308). Given a number K of nodes, each node 1304-$i$ may allocate an observation count array 1310 with K slots 1312-$i$, each slot storing the observation count of a respective node (i.e., the first slot 1312-1 stores the number of observations in the repository 1308 of Node 1 1304-1; the second slot 1312-2 stores the number of observations in the repository 1308 of Node 2; ... ). Initially, the node will fill in only its own observation count, e.g., Node 3 adds its own observation count to the third slot 1312-3 of the observation count array 1310. The remaining slots 1312-$i$ may be zeroed out. The observation count array(s) 1310 may be distributed to the other nodes 1304-$i$ (or the central node 1302), and then the non-zero information from each received array may be used to fill in the missing information in the current node's array 1310.

Each node may also store a sketch array 1314. The sketch array stores a number N of sketches for each of the K nodes, where N corresponds to a number of variables associated with the observations. The term 'sketch' refers to a summary that represents a large data set with a compact summary, typically much smaller than the full size of the input. Sketches may vary in complexity, from histograms to relatively more complex t-digests. The size reduction achieved may vary greatly from sketch-to-sketch, but in some embodiments described herein a data set of size Q (where Q represents the number of observations) can be reduced to a size of about log(Q).

A 'sketching procedure' or 'sketching algorithm' generally refers to the process of making a sketch. Given an input of M items $(x_1, x_2, \ldots x_M)$, each item x (where x is drawn from some domain U) is mapped into a small sketch vector that records frequency information. Each observation $x_i$ consists of N variables $(V_1, V_2, \ldots V_N)$. Thus, the sketch does not store the items explicitly, but only information about the frequency distribution. Sketches support fundamental queries on their input such as point and range queries to be answered quickly (albeit approximately). In some examples described herein, a sketch may be represented by an histogram of the values for the variables associated with each observation.

The node may allocate an appropriate amount of space for the sketch array 1314 by estimating a worst-case scenario for the size of each sketch included in the array based on the number of observation counts computed above. As noted above, the size reduction that is possible will vary depending on the sketching procedure employed, and so the worst-case scenario may be computed on a case-by-case basis. By way of example, when a t-digest sketch algorithm is used, a reasonable worst-case size may be log(M)/$\Delta$, where M is the number of observations on the node and $\Delta$ represents a t-digest parameter that controls the digest precision. In contrast, when a histogram is used, the worst-case scenario for the size may be dependent upon the number of bins used in the histogram.

Thus, each sketch array 1314 may include a number of slots 1318-$n$-$k$ corresponding to a product of the number of variables and the number of nodes (i.e., N*K). As was the case with the observation count array 1310, information related to other nodes may initially be zeroed out in a given node's sketch array 1314. When each node's sketch array 1314 is received (either at a given worker node, or at the central node 1302), the sketches for each variable $V_i$ may be combined into summary sketches 1322-$i$ in a summary sketch array 1320 (in most cases, via sketch-specific combination logic that particularly defines how to incorporate information relating to the particular variable that is the subject of the sketch). As was the case for computing the worst-case scenario for the size of the sketch, the combination logic may also be sketch-algorithm dependent. For a histogram, one may simply add the corresponding bins together. For a t-digest, the merging algorithm is somewhat more complex, but is well-understood in the art.

Figure 15A:
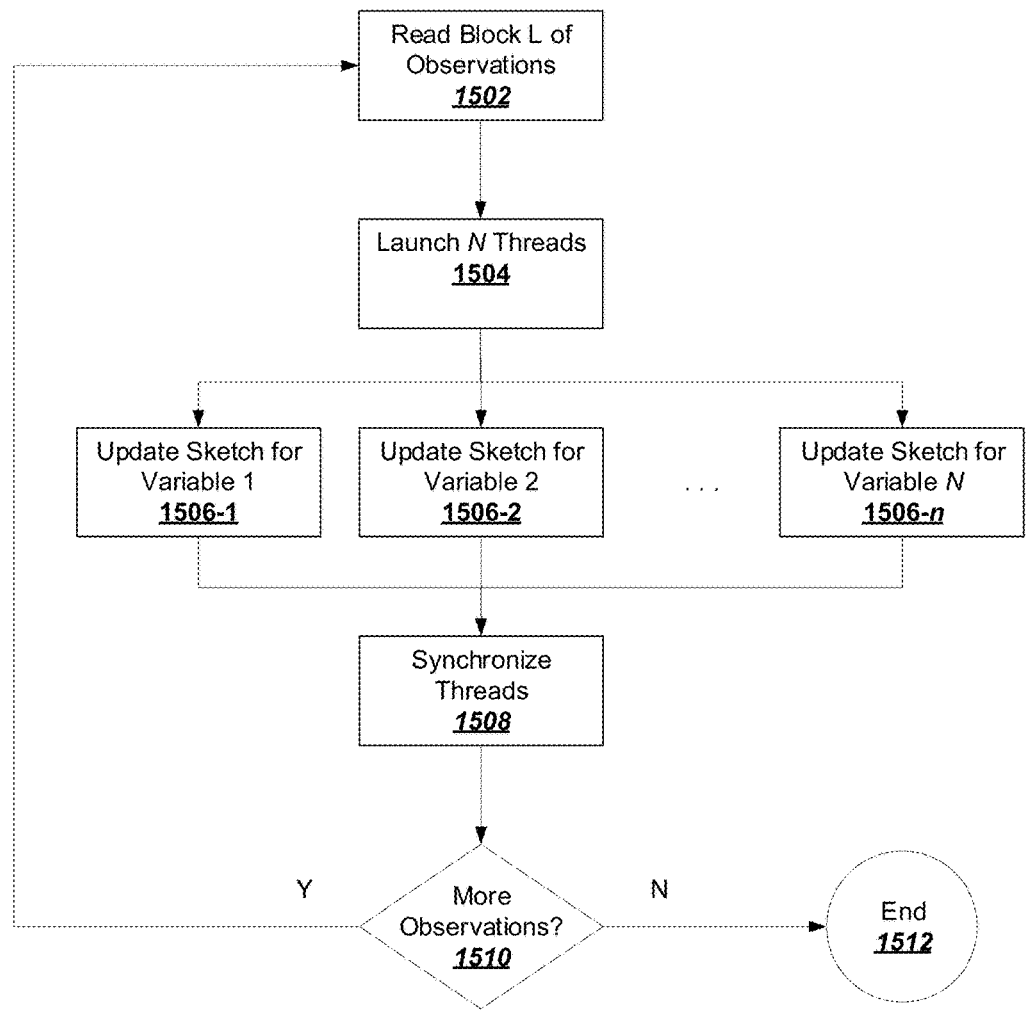
FIG. 15A illustrates a flow chart of an example of procedure for determining a sketch using a single read of each observation.
Figure 15B:
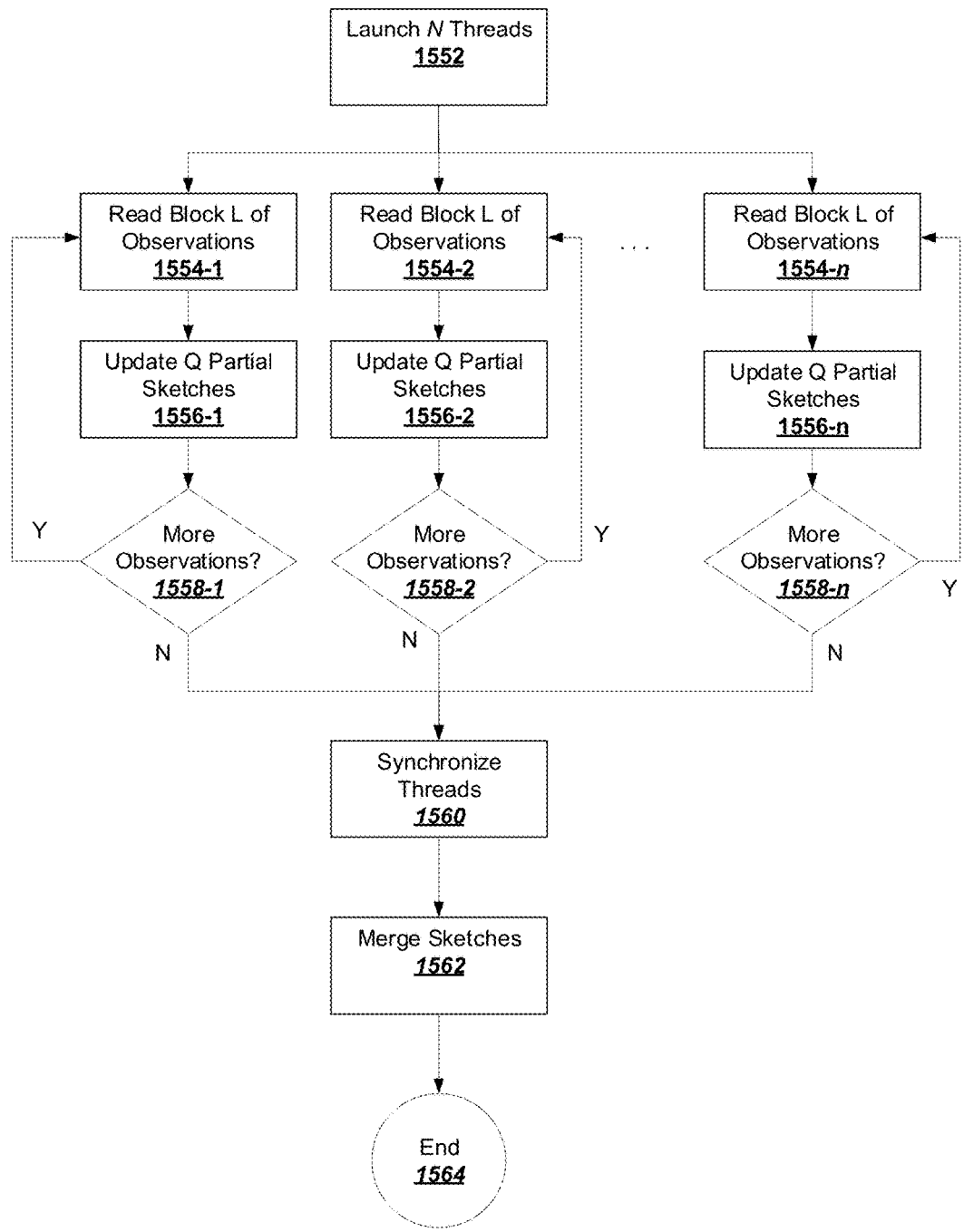
FIG. 15B illustrates a flow chart of an example of a procedure for determining a sketch by assigning subsets of observations to different computing threads.
Figure 16:
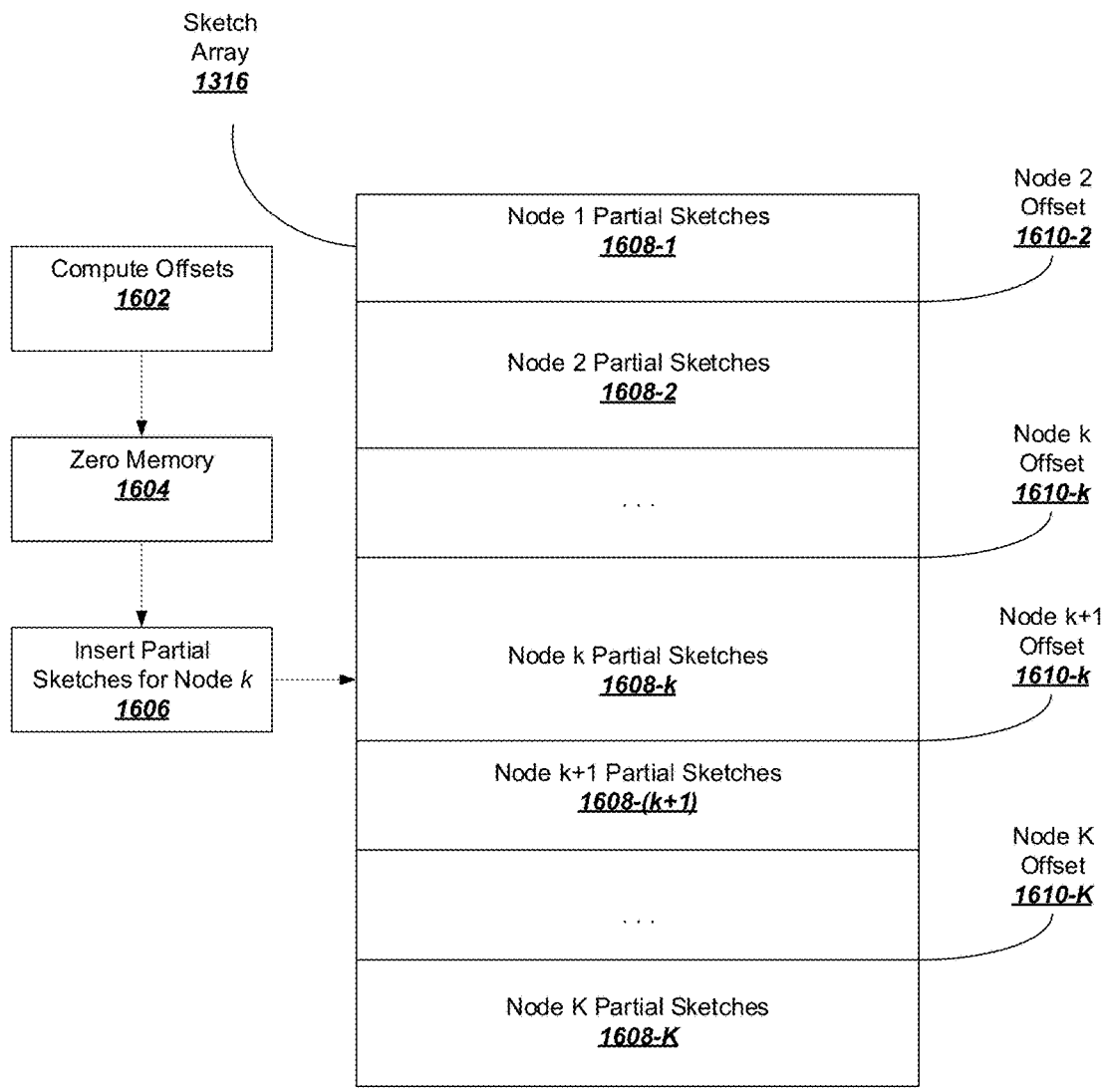
FIG. 16 illustrates a flow chart of an example of a procedure for merging different nodes' sketches.

An exemplary procedure for generating the above-described summary sketches, and for using the summary sketches to approximate a measurement, is next described with reference to FIGS. 14-16.

Figure 14:
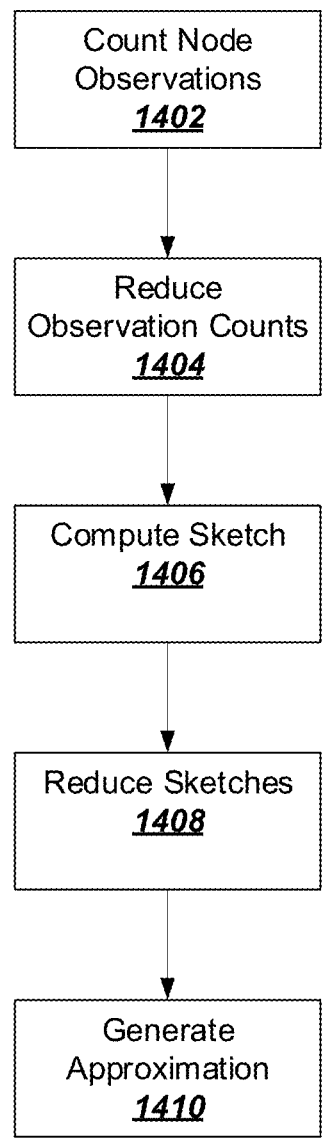
FIG. 14 illustrates a flow chart of an example of a process for approximating the measurement.

FIG. 14 is a flowchart depicting an overall procedure for determining an approximation of a measurement. Particular portions of the procedure are described in more detail with reference to FIGS. 15A, 15B, and 16.

At block 1402, the number of observations on each node may be counted. As the data is split between some or all of the computing nodes in the grid, each node counts how many observations are stored locally. Note that this observation count may only need to be done once, regardless of how measurements are being computed. Block 1402 may be carried out dynamically, as new observations are received (e.g., keeping a running total of the number of observations stored in the node's repository), or may be done on-demand (e.g., when a particular measurement is requested).

At block 1404, observation counts may be reduced across nodes. Each node may allocate an array to hold the observation count from all nodes. Each node may insert its observation count in the proper element of this array while zeroing out the others. For example, the node's "proper element" may correspond to the node's rank in the distributed communicator process, although other techniques for assigning a given element to a particular node may also be used.

Given this setup, all nodes can execute a reduce function with "ADD" specified as a binary operation; the reduce function essentially adds corresponding elements of the arrays stored on each node and either puts the resulting summed array on the master node or on all nodes. If the results are summarized on the master node only, then another communication round may be required to distribute the final results to all nodes; if the results are summarized on all nodes, then no such further communication round may be necessary. As was the case in block 1402, the procedures of block 1404 need be done only once regardless of how many measurements are being computed.

At block 1406, one or more sketches (corresponding to a number N of the variables associated with the observations) may be computed on each node. Sketching may be achieved in a number of different ways; FIGS. 15A and 15B show two examples.

For instance, FIG. 15A depicts an example in which each observation is read only once on each node. At block 1502, a respective node reads a block of L observations residing on the node. The observations may be stored in the node's memory and/or in a storage device (e.g., a disk) of the node. The observations may be stored in the node-specific observation repository 1308 discussed above.

At block 1504, the node launches N threads (where N corresponds to the number of variables associated with the observations; one sketch will be computed for each variable, each thread being assigned to work on one associated sketch). At block 1506-*i* (i=1, 2, . . . N), the $i^{th}$ thread updates its associated sketch for its associated variable.

Sketching is typically done on a variable-by-variable basis (with a particular sketching algorithm implemented by variable-specific sketching logic). Accordingly, the particular sketching performed at block 1506-*i* may depend on the particular variable for which the sketch is being computed. For example, the computation of quantile sketches are described in "Optimal Quantile Approximation in Streams," by Karnin et al. (2016); sketches for quantile queries and cardinality queries are described in "Composed Sketch Framework for Quantiles and Cardinality Queries over Big Data Streams," by Zhang et al. (2017); other examples of sketching algorithms will be readily apparent to one of ordinary skill in the art.

At block 1508, the node may synchronize the threads operating on the node in order to ensure that all sketches on the node are updated prior to reading the next observation(s). If more observations remain in the repository (block 1510), processing returns to block 1502 and the next observation is accessed. Once all observations are read, processing proceeds to block 1512 and terminates (or returns to a corresponding point in FIG. 14).

FIG. 15B depicts a second example of sketch calculation, in which each thread is responsible for handling a subset of the observations and updates each of N partial sketches based on the observations handled.

At block 1552, the node launches Qthreads, similar to the example described above. Each of the N threads are assigned a subset of the observations in the repository (e.g., if there are R observations in the repository, each thread may be assigned R/Q observations).

At block 1554-*i*, the $i^{th}$ thread may read the next observation assigned to it. At block 1556-*i*, the $i^{th}$ thread may update each of N partial sketches, based on the N variables in the observation read in block 1554-*i*. At block 1558-*i*, the thread may determine whether more observations exist in its subset; if so, processing returns to block 1554-*i*, and if not, processing proceeds to block 1560 (where the threads are synchronized to ensure that the updating process for each partial sketch is complete, making it it is safe to merge the partial sketches together). These blocks are similar to the corresponding blocks from FIG. 15A, with the exception that the observations are distributed across the threads.

At block 1562, the partial sketches from the various threads may be merged into a single node-specific sketch for each variable. Because each of Q threads computes N partial sketches, this means that QN partial sketches are merged into N node-specific sketches. Note that the merge operation is typically specific to the sketching algorithm. Therefore, the procedure for merging sketches may be defined on a sketch-by-sketch basis, depending on the particular variable represented. Accordingly, sketch-specific merging logic may be accessed by the node and applied to reduce the sketches across the various nodes.

At block 1564, processing may terminate (or return to a corresponding portion of FIG. 14).

After computing the sketches, at block 1408 (FIG. 14), the sketches may be reduced across the nodes. FIG. 16 depicts one example embodiment of this process.

In order to reduce the sketches across the nodes, each node may allocate an array to hold N sketches from K nodes. To determine a size for the array, at block 1602 the node may compute offsets for each node. Because the array needs to store N sketches, which may be of different sizes, for each of the nodes, the current node may estimate a size needed to store the N sketches by estimating a worst-case sketch size based on the number of observations received in block 1404. Using this size, the node determines an offset 1610-*i* into the array for which the partial sketches 1608-*i* of the $i^{th}$ node will begin.

At block 1604, each node may insert its N sketches in the proper array elements while zeroing out the others, similar to the procedure described above in connection with block 1404. Here, "proper array elements" are computed from the node rank and the expected worst-case sketch size based on the number of observations determined in block 1404. At block 1606, the node may receive partial sketches from each of the other nodes, and insert the partial sketches into the proper array elements corresponding to the sending node.

Given this setup, the nodes may execute the reduce function with ADD specified as the binary operation. Following the reduce operation, the sketch data for all N variables is merged into one final sketch per variable. As was the case with block 1562, the procedure for merging sketches may be defined on a sketch-by-sketch basis, depending on the particular variable represented. Accordingly, sketch-specific merging logic may be accessed by the node and applied to reduce the sketches across the various nodes.

Returning to FIG. 14, with the sketches appropriately reduced or merged the node can generate an approximation of a measurement using the sketches at block 1410. In one embodiment, a sketch may essentially represent an adaptive histogram, and may consist of L bins for which the bin center and number of elements associated with the bin are given. The distribution of data within a bin may be assumed to be uniform, or another type of distribution may be assumed. For such an embodiment, there are a number of different ways to approximate a given measurement; two are described below.

First, an approximate data regeneration method may be used. This method is appropriate for any robust statistic. Here, an approximation to the original data is generated on an "as needed" basis as part of the robust statistic computation. The approximation to any data point within a histogram bin can be computed using Equation (1):

$$\hat{x} = 0.5(b_{c,i} + b_{c,i-1}) + (0.5 + k)\left(\frac{b_{c,i+1} - b_{c,i-1}}{b_{n,i}}\right) \qquad \text{Eq. (1)}$$

Here, $b_{c,i}$ is the value of the $i^{th}$ bin center, $b_{n,i}$ is the number of elements associated the $i^{th}$ bin, and $0 \le k < b_{n,j}$. Note that for the first and last bins the regeneration equation may be modified to:

$$\hat{x} = b_{c,1} - 0.5(b_{c,2} + b_{c,1}) + (0.5 + k)\left(\frac{b_{c,2} - b_{c,1}}{b_{n,1}}\right) \qquad \text{Eq. (2)}$$

and $$\hat{x} = b_{c,L} - 0.5(b_{c,L} + b_{c,L-1}) + (0.5 + k)\left(\frac{b_{c,L} - b_{c,L-1}}{b_{n,L}}\right) \qquad \text{Eq. (3)}$$

respectively.

A second example is the pairwise method. Pairwise methods may be used to compute robust statistics that depend on pairwise operations (e.g., the robust estimates of scale $S_n$, $Q_n$, and $P_n$). Here, the pairwise difference (or sum) of data points contained in histogram bins j and k provide an approximation to the empirical density function for differences (or sums) for the entire data set (i.e. $\hat{f}_{jk}(*) \approx \hat{f}_{jk}(*)$). By summing the contributions from each pair of bins with appropriate weighting, the full empirical density function can be computed efficiently. One can then efficiently compute one or more quantiles needed for a particular robust statistic from the density function by simple numerical integration. This transforms an inherently $O(N^2)$ operation into one that is $O(L^2)$, a considerable efficiency gain since $L \ll N$. The equation for the full density function is given by:

$$\hat{f}(*) = \frac{2}{W(W-1)} \left[ \sum_{j=1}^{L} \sum_{k=j+1}^{L} b_{n,j} b_{n,k} \hat{f}_{jk}(*) + \sum_{j=1}^{L} \frac{b_{n,j}(b_{n,j}-1)}{2} \hat{f}_{jj}(*) \right] \quad \text{Eq. (4)}$$

where W is the total number of original observations and $$* = |x_k - x_j| \text{ or } * = \frac{x_j + x_k}{2}.$$

When assuming a uniform distribution, the empirical density function for each pair of histogram bins reduces to simple forms. Taking $* = |x_k - x_j|$, as an example, when $j = k$, $\hat{f}_{jj}(*)$ is a straight line that starts at $(\Delta x, b_{n,j}-1)$ and ends at $((b_{n,j}-1)\Delta x_j, 1)$ at intervals of $\Delta x_j$, where $\Delta x_j$ is the uniform spacing within bin j is given by:

$$\Delta x_j = \frac{(\text{width bin } j)}{b_{n,j}} \quad \text{Eq. (5)}$$

When $j \neq k$, $\hat{f}_{jk}(*)$ is a piecewise linear function. The function has support from $\delta - (b_{n,j}-1)\Delta x \leq x \leq \delta + (b_{n,k}-1)\Delta x$ at intervals $\Delta x$, where $\Delta x = \min(\Delta x_j, \Delta x_k)$ and $\delta = b_{c,k} - b_{c,j}$. Starting from the initial support point, the function monotonically increases from 1 (by 1) until it reaches a value of $\beta = \min(b_{n,j}, b_{n,k})$. If $b_{n,j} = b_{n,k}$, the function then monotonically decays by 1 until it reaches 1. Otherwise, the function stays constant at $\beta$ until reaching the support point that is the final support point minus $\beta \Delta x$. At this point the function decays by 1 until it reaches 1. Similar simple functional forms can be given for $$* = \frac{x_j + x_k}{2}.$$

Figure 17A:
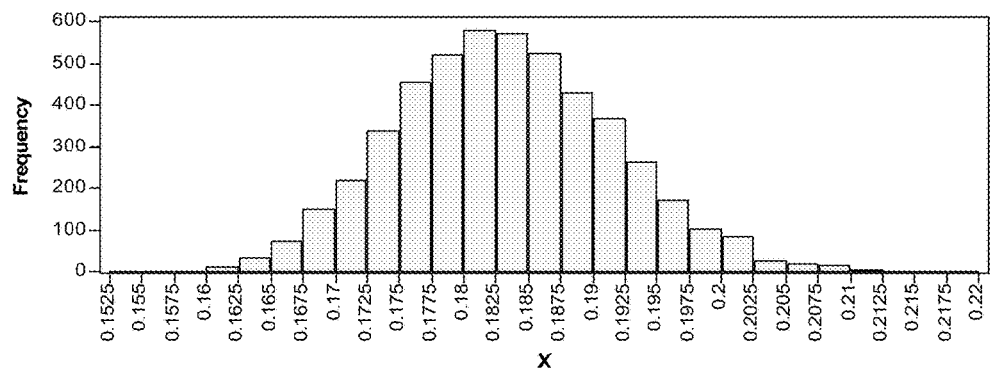
FIGS. 17A-17C illustrate histograms of an example of a measurement calculation.
Figure 17B:
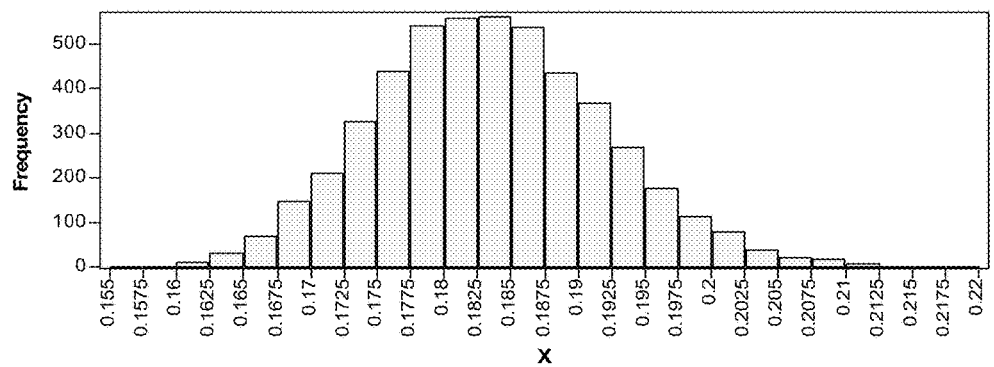
Figure 17C:
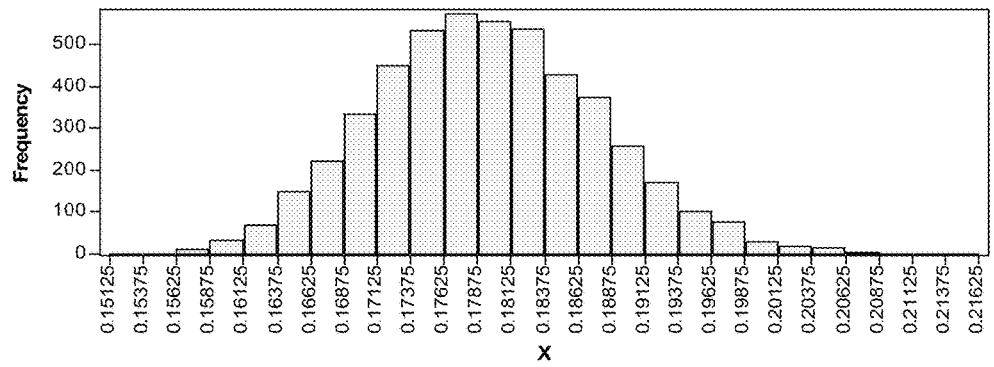

As noted above, this technique yields an approximation of a measurement based on a sketch rather than a straightforward calculation of the measurement based on the observations. FIGS. 17A-17C are histograms of an example used to evaluate how well the approximation matches the actual calculation of the measurement.

This example uses the approximate data regeneration method described above to approximate the robust scale metric $Q_n$. This metric is particularly ill-suited for distributed computation because it requires the computation of the pairwise differences of all observations for each variable. Without the techniques described above, this would require moving all the data to a single machine or heavy inter-node communication. If all the data is moved to a single machine, a large amount of network resources are required to transfer each observation to the designated machine; moreover, a bottleneck is created at the receiving machine, which must take in a large number of observations all at once. If the pairwise differences are computed via inter-node communication, the data transmissions may be relatively better distributed through the network, but a correspondingly larger amount of network bandwidth is used (some bandwidth being consumed in the service of potentially redundant calculations). With the above-described technique, the steps for a naïve computation of $Q_n$ for a data set with W total observations may be represented by the following pseudo-code:

a.) perform blocks 1402-1408 on all nodes. Then, on each node:
b.) i = 1
c.) generate $\hat{x}_i$, using the approximate data regeneration method
d.) j = i + 1
e.) generate $\hat{x}_j$
f.) insert $|\hat{x}_j - \hat{x}_i|$ into summary buffer y
g.) j = j + 1
h.) if j ≤ W then return to e.)
i.) i = i + 1
j.) if i < W then return to d.)
k.) sort summary buffer y l.) extract element $\left( \frac{\lfloor W/2 \rfloor + 1}{2} \right)$ from summary buffer y This example is intended for illustration purposes only and may not be particularly computationally efficient. However, it can be seen that any given node only needs to have storage for the sketch and two approximate values per variable in the data set (stream). The original data does not have to be re-accessed nor is there any communication required between nodes. Once a node has the complete sketch, it can compute $Q_n$ (or any other robust statistic) independently.

FIGS. 17A-17C are histograms that depict the results of a Monte Carlo simulation of the robust estimate of scale $Q_n$ based on data that consisted of 75% variable values in the range of N(-2.0,0.1) and 25% variable values in the range of N(2.0,1.0). The x-axes depict the distribution of values for the thus-generated variables organized into bins, whereas the y-axis depicts the frequency at which values within each bin were observed.

Based on this data, values for Qn were computed using an exact implementation (FIG. 17A), the approximate method described above (FIG. 17B), and the pairwise method described above (FIG. 17C).

The sample mean value of $Q_n$ for the exact implementation was 0.1832534 versus 0.1835126 for the approximate data regeneration method and 0.1795565 for the pairwise method. The sample standard deviation of $Q_n$ for the exact implementation was 0.008705 versus 0.0087461 for approximate data regeneration method and 0.0086895 for the pairwise method. This shows that there is good agreement between the approximations described herein and the exact implementations that they are intended to replace. In other words, a great deal of accuracy is not lost despite the fact that, as described above, the approximations of FIGS. 17B and 17C are more efficient in terms of computation and inter-node communication. This also shows that the approximations are not found to be strongly biased or inaccurate due to the use of approximate data.

In order to improve the agreement between the exact implementation and the proposed illustrative embodiments, the sketching algorithm parameters and/or the parameters of the respective methods may be adjusted until the desired agreement is reached.

Figure 18:
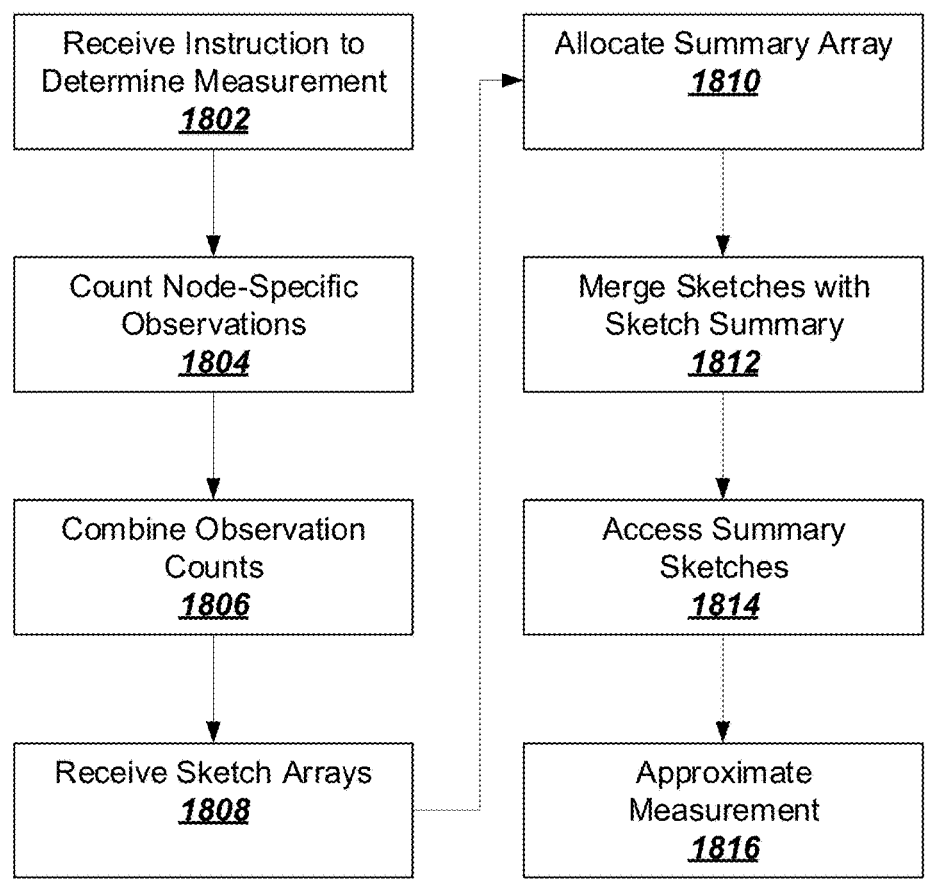
FIG. 18 illustrates a flow chart of an example of a process for approximating the measurement, according to one embodiment.

Turning to FIG. 18, another embodiment of a process for approximating the measurement is depicted. The measurement may be a robust statistic that is not a predetermined statistic specified before receiving the instruction to determine the measurement.

At block 1802, a distributed system may receive an instruction to determine a measurement from observations distributed among a plurality of nodes in a distributed environment. The observations may be associated with a plurality of variables.

At block 1804, the distributed system may, at each node of the plurality of nodes, count node-specific observations. In one embodiment, this may be accomplished by: accessing a data repository storing the node-specific observations; counting a number of the observations in the data repository; allocating a node-specific observation count array having a number of slots corresponding to a number of the plurality of nodes; inserting the number of observations into a slot in the node-specific observation count array corresponding to a current node associated with the observations; and transmitting the node-specific observation count array to at least one other node of the plurality of nodes.

At block 1806, the distributed system may combine the observations across the plurality of nodes. The combining may include, at each of the plurality of nodes: determining a node-specific sketch for each of the variables associated with the node-specific observations, the node-specific sketch representing a summary of the observations stored at the respective node as those observations relate to each of the variables and generated by mapping the respective node's observations into a sketch vector that records frequency information relating to the respective node's observations; and storing the node-specific sketches in a node-specific sketch array.

Combining the observations may further include receiving a plurality of node-specific observation count arrays, each containing node-specific observation counts, each observation count originating at a respective node in the distributed environment, the observation counts representing a number of observations of data stored at the respective node, and merging the plurality of node-specific observation count arrays into an overall observation count array comprising the node-specific observation counts for each node in the plurality of nodes.

Combining the observations may further include, at each of the plurality of nodes: allocating a node-specific sketch array having a number of slots corresponding to the product of the number of the plurality of nodes and the number of the plurality of variables, for each of the plurality of variables, inserting a corresponding node-specific sketch for the variable into a slot in the node-specific sketch array corresponding to a current node and current variable, and transmitting the node-specific sketch array to the at least one other node of the plurality of nodes.

In some embodiments, the at least one other node is a master node that coordinates the determination of the measurement. In others, the at least one other node is another node on which observations are stored.

In some embodiments, the sketches are determined by: (1) forking, at the respective node, a plurality of threads, a number of the plurality of threads corresponding to a number of the plurality of variables, each thread associated with a corresponding sketch, (2) reading one or more observations from among the node-specific observations stored at the respective node, (3) on each of the plurality of threads, updating the corresponding sketch by mapping the one or more observations into a sketch vector that records frequency information relating to the next observation, and (4) repeating (2) and (3) in parallel until each observation of the node-specific observations is read.

In other embodiments, the sketches are determined by: (1) dividing, at the respective node, a number of the node-specific observations stored at the respective node into a number of subsets, (2) forking, at the respective node, a plurality of threads, a number of the plurality of threads corresponding to the number of subsets, (3) on each of the plurality of threads, reading a next observation from among the subset of node-specific observations assigned to the thread, (4) on each of the plurality of threads, updating each sketch associated with the respective node by mapping the next observation into a sketch vector that records frequency information relating to the next observation, and (5) repeating (3) and (4) in parallel on the plurality of threads until each observation of the node-specific observations is read.

At block 1808, a node in the distributed system may receive a plurality of node-specific sketch arrays, each node-specific sketch array originating at a respective node in the distributed environment.

At block 1810, the node may optionally allocate a summary array, the summary array including a number of slots corresponding to the number of variables associated with the observations, each slot holding a summary sketch for summarizing the node-specific sketches from each node related to a given variable.

At block 1812, the node may, for each of the node-specific sketch arrays: access each node-specific sketch from the node-specific sketch array, each node-specific sketch associated with a variable; access sketch merging logic that defines how to combine multiple sketches for the variable; and apply the sketch merging logic to merge the current node-specific sketch for the variable with a summary sketch for the variable.

At block 1814, the node may optionally determine one or more variables used to determine the measurement, and access the summary sketches for the one or more variables used to determine the measurement.

At block 1816, the node may generate an approximation of a determination of the measurement using the summary sketches for the one or more variables.

In some embodiments, the determination of the measurement is approximated by a pairwise method comprising: dividing a selected sketch from the summary sketches into a plurality of bins; for each pair of bins in the plurality of bins, determining a contribution of the pair of bins to an empirical density function of the observations; summing a weighted contribution of each pair of bins; generating the empirical density function from the summed weighted contributions; and determining the measurement from the empirical density function.

In further embodiments which may be used in combination with the embodiments described above, the determination of the measurement is approximated by an approximate data regeneration method comprising: dividing a selected sketch from the summary sketches into a plurality of bins; approximating one or more data points from the observations within one or more of the plurality of bins; and using the approximated data points to compute the measurement.

In some embodiments, the approximation is generated using two or fewer communication rounds among nodes of the distributed computing grid, where a communication round comprises each of the nodes of the distributed computing grid transmitting information to other nodes of the distributed computing grid. Preferably, the determination of the measurement is approximated in a single pass through data stored across a distributed computing grid.

What is claimed is:

1. A non-transitory computer-readable medium storing instructions that, when executed by one or more processors, cause the one or more processors to:
receive an instruction to determine a measurement from observations distributed among a plurality of nodes in a distributed environment, the observations associated with a plurality of variables;
at each node of the plurality of nodes, count node-specific observations;
combine the observations across the plurality of nodes, the combining comprising, at each of the plurality of nodes:
determining a node-specific sketch for each of the variables associated with the node-specific observations, the node-specific sketch representing a summary of the observations stored at the respective node as those observations relate to each of the variables and generated by mapping the respective node's observations into a sketch vector that records frequency information relating to the respective node's observations, wherein the sketches are determined by:
(1) dividing, at the respective node, a number of the node-specific observations stored at the respective node into a number of subsets,
(2) forking, at the respective node, a plurality of threads, a number of the plurality of threads corresponding to the number of subsets,
(3) on each of the plurality of threads, reading a next observation from among the subset of node-specific observations assigned to the thread,
(4) on each of the plurality of threads, updating each sketch associated with the respective node by mapping the next observation into a sketch vector that records frequency information relating to the next observation, and
(5) repeating (3) and (4) in parallel across the plurality of threads on the respective node until each observation of the node-specific observations is read, and
storing the node-specific sketches in a node-specific sketch array;
receive a plurality of node-specific sketch arrays, each node-specific sketch array originating at a respective node in the distributed environment;
for each of the node-specific sketch arrays:
access each node-specific sketch from the node-specific sketch array, each node-specific sketch associated with a variable,
access sketch merging logic that defines how to combine multiple sketches for the variable, and
apply the sketch merging logic to merge the current node-specific sketch for the variable with a summary sketch for the variable; and
generate an approximation of the measurement using the summary sketches for the one or more variables.

2. The medium of claim 1, wherein the counting comprises:
accessing a data repository storing the node-specific observations,
counting a number of the observations in the data repository,
allocating a node-specific observation count array having a number of slots corresponding to a number of the plurality of nodes,
inserting the number of observations into a slot in the node-specific observation count array corresponding to a current node associated with the observations, and
transmitting the node-specific observation count array to at least one other node of the plurality of nodes.

3. The medium of claim 1, further comprising:
determining one or more variables used to determine the measurement; and
accessing the summary sketches for the one or more variables used to determine the measurement.

4. The medium of claim 1, wherein combining the observations across the plurality of nodes comprises:
receiving a plurality of node-specific observation count arrays, each containing node-specific observation counts, each observation count originating at a respective node in the distributed environment, the observation counts representing a number of observations of data stored at the respective node, and
merging the plurality of node-specific observation count arrays into an overall observation count array comprising the node-specific observation counts for each node in the plurality of nodes.

5. The medium of claim 1, further comprising allocating a summary array, the summary array comprising a number of slots corresponding to the number of variables associated with the observations, each slot holding a summary sketch for summarizing the node-specific sketches from each node related to a given variable.

6. The medium of claim 1, wherein combining the observations further comprises, at each of the plurality of nodes:
allocating a node-specific sketch array having a number of slots corresponding to the product of the number of the plurality of nodes and the number of the plurality of variables,
for each of the plurality of variables, inserting a corresponding node-specific sketch for the variable into a slot in the node-specific sketch array corresponding to a current node and current variable, and
transmitting the node-specific sketch array to the at least one other node of the plurality of nodes.

7. The medium of claim 1, wherein the measurement is a robust statistic that is not a predetermined statistic specified before receiving the instruction to determine the measurement.

8. The medium of claim 1, wherein the approximation is generated using two or fewer communication rounds among nodes of the distributed computing grid, where a communication round comprises each of the nodes of the distributed computing grid transmitting information to other nodes of the distributed computing grid.

9. The medium of claim 1, wherein the at least one other node is a master node that coordinates the determination of the measurement, or the at least one other node is another node on which observations are stored.

10. The medium of claim 1, wherein the determination of the measurement is approximated by a pairwise method comprising:
dividing a selected sketch from the summary sketches into a plurality of bins;
for each pair of bins in the plurality of bins, determining a contribution of the pair of bins to an empirical density function of the observations;
summing a weighted contribution of each pair of bins;

generating the empirical density function from the summed weighted contributions; and determining the measurement from the empirical density function.

11. The medium of claim 1, wherein the determination of the measurement is approximated by an approximate data regeneration method comprising:

dividing a selected sketch from the summary sketches into a plurality of bins;

approximating one or more data points from the observations within one or more of the plurality of bins; and using the approximated data points to compute the measurement.

12. The medium of claim 1, wherein the determination of the measurement is approximated in a single pass through data stored across a distributed computing grid.

13. A method comprising:

receiving an instruction to determine a measurement from observations distributed among a plurality of nodes in a distributed environment, the observations associated with a plurality of variables;

at each node of the plurality of nodes, counting node-specific observations;

combining the observations across the plurality of nodes, the combining comprising, at each of the plurality of nodes:

determining a node-specific sketch for each of the variables associated with the node-specific observations, the node-specific sketch representing a summary of the observations stored at the respective node as those observations relate to each of the variables and generated by mapping the respective node's observations into a sketch vector that records frequency information relating to the respective node's observations, wherein the sketches are determined by:

(1) dividing, at the respective node, a number of the node-specific observations stored at the respective node into a number of subsets, (2) forking, at the respective node, a plurality of threads, a number of the plurality of threads corresponding to the number of subsets, (3) on each of the plurality of threads, reading a next observation from among the subset of node-specific observations assigned to the thread, (4) on each of the plurality of threads, updating each sketch associated with the respective node by mapping the next observation into a sketch vector that records frequency information relating to the next observation, and (5) repeating (3) and (4) in parallel across the plurality of threads on the respective node until each observation of the node-specific observations is read, and storing the node-specific sketches in a node-specific sketch array;

receiving a plurality of node-specific sketch arrays, each node-specific sketch array originating at a respective node in the distributed environment;

for each of the node-specific sketch arrays:

accessing each node-specific sketch from the node-specific sketch array, each node-specific sketch associated with a variable, accessing sketch merging logic that defines how to combine multiple sketches for the variable, and applying the sketch merging logic to merge the current node-specific sketch for the variable with a summary sketch for the variable; and generating an approximation of the measurement using the summary sketches for the one or more variables.

14. The method of claim 13, wherein the counting comprises:

accessing a data repository storing the node-specific observations, counting a number of the observations in the data repository, allocating a node-specific observation count array having a number of slots corresponding to a number of the plurality of nodes, inserting the number of observations into a slot in the node-specific observation count array corresponding to a current node associated with the observations, and transmitting the node-specific observation count array to at least one other node of the plurality of nodes.

15. The method of claim 13, wherein combining the observations across the plurality of nodes comprises:

receiving a plurality of node-specific observation count arrays, each containing node-specific observation counts, each observation count originating at a respective node in the distributed environment, the observation counts representing a number of observations of data stored at the respective node, and merging the plurality of node-specific observation count arrays into an overall observation count array comprising the node-specific observation counts for each node in the plurality of nodes.

16. The method of claim 13, wherein combining the observations further comprises, at each of the plurality of nodes:

allocating a node-specific sketch array having a number of slots corresponding to the product of the number of the plurality of nodes and the number of the plurality of variables, for each of the plurality of variables, inserting a corresponding node-specific sketch for the variable into a slot in the node-specific sketch array corresponding to a current node and current variable, and transmitting the node-specific sketch array to the at least one other node of the plurality of nodes.

17. The method of claim 13, wherein the approximation is generated using two or fewer communication rounds among nodes of the distributed computing grid, where a communication round comprises each of the nodes of the distributed computing grid transmitting information to other nodes of the distributed computing grid.

18. The method of claim 13, wherein the determination of the measurement is approximated in a single pass through data stored across a distributed computing grid.

19. The method of claim 13, wherein the determination of the measurement is approximated by a pairwise method comprising:

dividing a selected sketch from the summary sketches into a plurality of bins;

for each pair of bins in the plurality of bins, determining a contribution of the pair of bins to an empirical density function of the observations;

summing a weighted contribution of each pair of bins;

generating the empirical density function from the summed weighted contributions; and determining the measurement from the empirical density function.

20. The method of claim 13, wherein the determination of the measurement is approximated by an approximate data regeneration method comprising:
dividing a selected sketch from the summary sketches into a plurality of bins;
approximating one or more data points from the observations within one or more of the plurality of bins; and
using the approximated data points to compute the measurement.

21. An apparatus comprising:
a hardware interface configured to receive an instruction to determine a measurement from observations distributed among a plurality of nodes in a distributed environment, the observations associated with a plurality of variables;
a processing circuit configured to:
at each node of the plurality of nodes, count node-specific observations;
combine the observations across the plurality of nodes, the combining comprising, at each of the plurality of nodes:
determining a node-specific sketch for each of the variables associated with the node-specific observations, the node-specific sketch representing a summary of the observations stored at the respective node as those observations relate to each of the variables and generated by mapping the respective node's observations into a sketch vector that records frequency information relating to the respective node's observations, wherein the sketches are determined by:
(1) dividing, at the respective node, a number of the node-specific observations stored at the respective node into a number of subsets,
(2) forking, at the respective node, a plurality of threads, a number of the plurality of threads corresponding to the number of subsets,
(3) on each of the plurality of threads, reading a next observation from among the subset of node-specific observations assigned to the thread,
(4) on each of the plurality of threads, updating each sketch associated with the respective node by mapping the next observation into a sketch vector that records frequency information relating to the next observation, and
(5) repeating (3) and (4) in parallel across the plurality of threads on the respective node until each observation of the node-specific observations is read, and
storing the node-specific sketches in a node-specific sketch array;
receive a plurality of node-specific sketch arrays, each node-specific sketch array originating at a respective node in the distributed environment;
for each of the node-specific sketch arrays:
accessing each node-specific sketch from the node-specific sketch array, each node-specific sketch associated with a variable,
accessing sketch merging logic that defines how to combine multiple sketches for the variable, and
applying the sketch merging logic to merge the current node-specific sketch for the variable with a summary sketch for the variable; and
generate an approximation of the measurement using the summary sketches for the one or more variables.

22. The apparatus of claim 21, wherein the counting comprises:
accessing a data repository storing the node-specific observations,
counting a number of the observations in the data repository,
allocating a node-specific observation count array having a number of slots corresponding to a number of the plurality of nodes,
inserting the number of observations into a slot in the node-specific observation count array corresponding to a current node associated with the observations, and
transmitting the node-specific observation count array to at least one other node of the plurality of nodes.

23. The apparatus of claim 21, wherein combining the observations across the plurality of nodes comprises:
receiving a plurality of node-specific observation count arrays, each containing node-specific observation counts, each observation count originating at a respective node in the distributed environment, the observation counts representing a number of observations of data stored at the respective node, and
merging the plurality of node-specific observation count arrays into an overall observation count array comprising the node-specific observation counts for each node in the plurality of nodes.

24. The apparatus of claim 21, wherein combining the observations further comprises, at each of the plurality of nodes:
allocating a node-specific sketch array having a number of slots corresponding to the product of the number of the plurality of nodes and the number of the plurality of variables,
for each of the plurality of variables, inserting a corresponding node-specific sketch for the variable into a slot in the node-specific sketch array corresponding to a current node and current variable, and
transmitting the node-specific sketch array to the at least one other node of the plurality of nodes.

25. The apparatus of claim 21, wherein the approximation is generated using two or fewer communication rounds among nodes of the distributed computing grid, where a communication round comprises each of the nodes of the distributed computing grid transmitting information to other nodes of the distributed computing grid.

26. The apparatus of claim 21, wherein the determination of the measurement is approximated in a single pass through data stored across a distributed computing grid.

27. The apparatus of claim 21, wherein the determination of the measurement is approximated by a pairwise method comprising:
dividing a selected sketch from the summary sketches into a plurality of bins;
for each pair of bins in the plurality of bins, determining a contribution of the pair of bins to an empirical density function of the observations;
summing a weighted contribution of each pair of bins;
generating the empirical density function from the summed weighted contributions; and
determining the measurement from the empirical density function.

28. The apparatus of claim 21, wherein the determination of the measurement is approximated by an approximate data regeneration method comprising:
dividing a selected sketch from the summary sketches into a plurality of bins;
approximating one or more data points from the observations within one or more of the plurality of bins; and using the approximated data points to compute the measurement.

29. A non-transitory computer-readable medium storing instructions that, when executed by one or more processors, cause the one or more processors to:
receive an instruction to determine a measurement from observations distributed among a plurality of nodes in a distributed environment, the observations associated with a plurality of variables;
at each node of the plurality of nodes, count node-specific observations;
combine the observations across the plurality of nodes, the combining comprising, at each of the plurality of nodes:
determining a node-specific sketch for each of the variables associated with the node-specific observations, the node-specific sketch representing a summary of the observations stored at the respective node as those observations relate to each of the variables and generated by mapping the respective node's observations into a sketch vector that records frequency information relating to the respective node's observations, wherein the sketches are determined by:
(1) forking, at the respective node, a plurality of threads, a number of the plurality of threads corresponding to a number of the plurality of variables, each thread associated with a corresponding sketch,
(2) reading one or more observations from among the node-specific observations stored at the respective node,
(3) on each of the plurality of threads, updating the corresponding sketch by mapping the one or more observations into a sketch vector that records frequency information relating to the next observation, and
(4) repeating (2) and (3) in parallel across the plurality of threads on the respective node until each observation of the node-specific observations is read, and
storing the node-specific sketches in a node-specific sketch array;
receive a plurality of node-specific sketch arrays, each node-specific sketch array originating at a respective node in the distributed environment;
for each of the node-specific sketch arrays:
access each node-specific sketch from the node-specific sketch array, each node-specific sketch associated with a variable,
access sketch merging logic that defines how to combine multiple sketches for the variable, and
apply the sketch merging logic to merge the current node-specific sketch for the variable with a summary sketch for the variable; and
generate an approximation of the measurement using the summary sketches for the one or more variables.

30. A method comprising:
receiving an instruction to determine a measurement from observations distributed among a plurality of nodes in a distributed environment, the observations associated with a plurality of variables;
at each node of the plurality of nodes, counting node-specific observations;
combining the observations across the plurality of nodes, the combining comprising, at each of the plurality of nodes:
determining a node-specific sketch for each of the variables associated with the node-specific observations, the node-specific sketch representing a summary of the observations stored at the respective node as those observations relate to each of the variables and generated by mapping the respective node's observations into a sketch vector that records frequency information relating to the respective node's observations, wherein the sketches are determined by:
(1) forking, at the respective node, a plurality of threads, a number of the plurality of threads corresponding to a number of the plurality of variables, each thread associated with a corresponding sketch,
(2) reading one or more observations from among the node-specific observations stored at the respective node,
(3) on each of the plurality of threads, updating the corresponding sketch by mapping the one or more observations into a sketch vector that records frequency information relating to the next observation, and
(4) repeating (2) and (3) in parallel across the plurality of threads on the respective node until each observation of the node-specific observations is read, and
storing the node-specific sketches in a node-specific sketch array;
receiving a plurality of node-specific sketch arrays, each node-specific sketch array originating at a respective node in the distributed environment;
for each of the node-specific sketch arrays:
accessing each node-specific sketch from the node-specific sketch array, each node-specific sketch associated with a variable,
accessing sketch merging logic that defines how to combine multiple sketches for the variable, and
applying the sketch merging logic to merge the current node-specific sketch for the variable with a summary sketch for the variable; and
generating an approximation of the measurement using the summary sketches for the one or more variables.

31. A non-transitory computer-readable medium storing instructions that, when executed by one or more processors, cause the one or more processors to:
receive an instruction to determine a measurement from observations distributed among a plurality of nodes in a distributed environment, the observations associated with a plurality of variables;
at each node of the plurality of nodes, count node-specific observations;
combine the observations across the plurality of nodes, the combining comprising, at each of the plurality of nodes:
determining a node-specific sketch for each of the variables associated with the node-specific observations, the node-specific sketch representing a summary of the observations stored at the respective node as those observations relate to each of the variables and generated by mapping the respective node's observations into a sketch vector that records frequency information relating to the respective node's observations, and
storing the node-specific sketches in a node-specific sketch array;

receive a plurality of node-specific sketch arrays, each node-specific sketch array originating at a respective node in the distributed environment;

for each of the node-specific sketch arrays:
- access each node-specific sketch from the node-specific sketch array, each node-specific sketch associated with a variable,
- access sketch merging logic that defines how to combine multiple sketches for the variable, and
- apply the sketch merging logic to merge the current node-specific sketch for the variable with a summary sketch for the variable; and generate an approximation of the measurement using the summary sketches for the one or more variables, wherein the measurement is approximated by a pair-wise method comprising:
- dividing a selected sketch from the summary sketches into a plurality of bins;
- for each pair of bins in the plurality of bins, determining a contribution of the pair of bins to an empirical density function of the observations;
- summing a weighted contribution of each pair of bins;
- generating the empirical density function from the summed weighted contributions; and
- determining the measurement from the empirical density function.

* * * * *